United States Patent
Matsumoto

(10) Patent No.: US 6,546,312 B1
(45) Date of Patent: Apr. 8, 2003

(54) METHOD FOR INSTALLING AND REMOVING AUTOMATIC LIFT-TYPE MOBILE FACILITY, METHOD OF AUTOMATIC LIFT-TYPE POWER GENERATION, AND AUTOMATIC LIFT-TYPE MOBILE FACILITY

(75) Inventor: Kesafumi Matsumoto, Atsugi (JP)

(73) Assignee: Kouken Company, Limited, Kanagawa-ken (JP)

( * ) Notice: Subject to any disclaimer, the term of this patent is extended or adjusted under 35 U.S.C. 154(b) by 0 days.

(21) Appl. No.: 09/420,014

(22) Filed: Oct. 18, 1999

(30) Foreign Application Priority Data

Oct. 23, 1998 (JP) ............................. 10-303093

(51) Int. Cl.⁷ ................................................ G06F 7/00
(52) U.S. Cl. ........................................ 700/213; 414/498
(58) Field of Search ......................... 700/213; 414/498, 414/495, 909

(56) References Cited

U.S. PATENT DOCUMENTS

| | | | | |
|---|---|---|---|---|
| 2,789,234 A | * | 4/1957 | Lambert et al. ................. 290/1 |
| 3,119,503 A | * | 1/1964 | Herpich et al. ............... 214/512 |
| 3,148,516 A | * | 9/1964 | Kals .............................. 62/305 |
| 3,536,928 A | * | 10/1970 | Jones, Jr. et al. ............... 290/1 |
| 3,541,598 A | * | 11/1970 | Dousset ....................... 214/392 |
| 3,744,652 A | * | 7/1973 | Rieschel ...................... 214/392 |
| 3,749,363 A | * | 7/1973 | Hauser ........................ 414/498 |
| 3,786,951 A | * | 1/1974 | Ruff et al. .................... 414/498 |
| 3,865,911 A | * | 2/1975 | Lefevre ....................... 261/140 |
| 4,112,027 A | * | 9/1978 | Cates .......................... 261/151 |
| 4,136,432 A | * | 1/1979 | Melley, Jr. ..................... 29/469 |
| RE30,280 E | * | 5/1980 | Berman et al. ................. 290/1 |
| 4,240,499 A | * | 12/1980 | Kals ............................... 165/1 |
| 4,469,954 A | * | 9/1984 | Maehara ........................ 290/1 |
| 4,476,065 A | * | 10/1984 | McKey ........................ 261/23 |
| 4,522,550 A | * | 6/1985 | Whitehouse ................. 414/498 |
| 4,750,855 A | * | 6/1988 | Anderson .................... 414/498 |
| 4,992,669 A | * | 2/1991 | Parmley ......................... 290/1 |
| 5,148,859 A | * | 9/1992 | Beamer ........................ 165/41 |
| 5,356,262 A | * | 10/1994 | Babienko et al. ........... 414/498 |
| 5,417,540 A | * | 5/1995 | Cox ............................. 414/498 |
| 5,435,382 A | * | 7/1995 | Carter ......................... 165/110 |
| 5,724,828 A | * | 3/1998 | Korenic ........................ 62/305 |
| 5,800,114 A | * | 9/1998 | Secondi ...................... 414/498 |
| 5,924,478 A | * | 7/1999 | Crocker ........................ 165/95 |
| 6,071,062 A | * | 6/2000 | Warhurst et al. ............ 414/498 |
| 6,142,219 A | * | 11/2000 | Korenic et al. ............. 165/110 |

FOREIGN PATENT DOCUMENTS

| | | |
|---|---|---|
| JP | 63-149336 | 9/1988 |
| JP | 3-195429 | 8/1991 |
| JP | 3-195430 | 8/1991 |
| JP | 4-47315 | 4/1992 |
| JP | 6-263255 | 9/1994 |

\* cited by examiner

*Primary Examiner*—Khoi H. Tran
(74) *Attorney, Agent, or Firm*—Jordan and Hamburg LLP

(57) ABSTRACT

The present invention includes automatic lift-type power generation equipment unit A which is one of the equipment within the automatic lift-type mobile facility that is adapted to be loaded onto the rear of a carrying vehicle (a), comprising a power generation section 1A which is a component of said mobile facility, supplies electric power by generating said power, and includes cubicle 3A, prime mover equipment 4A, and electric power equipment 5A, and an automatic lifting-and-lowering section 2A which includes chassis 6A, outriggers 7A, jacks 8A, universal casters, and a remote controller.

18 Claims, 9 Drawing Sheets

FIG. 7
(a)
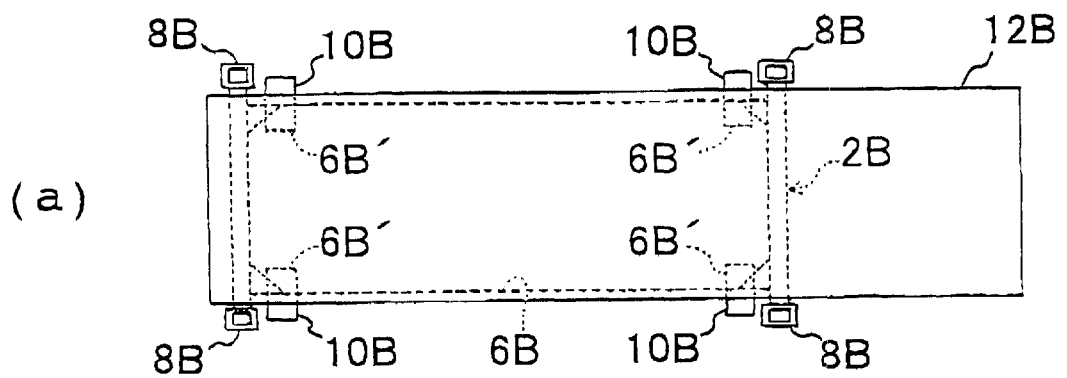
(b)
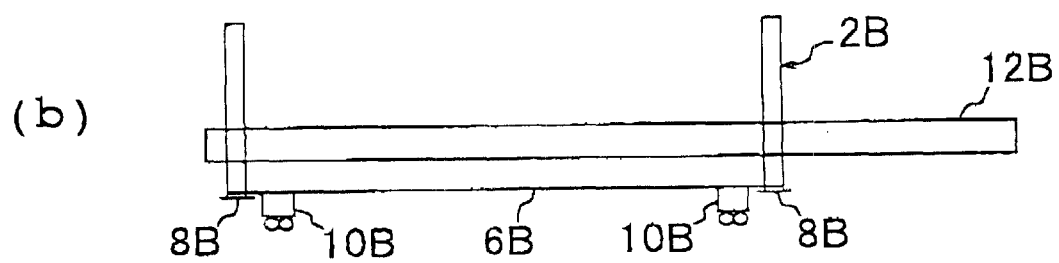
(c)
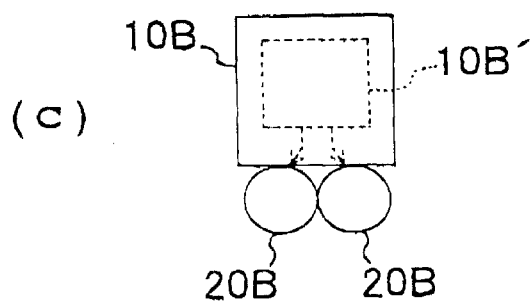

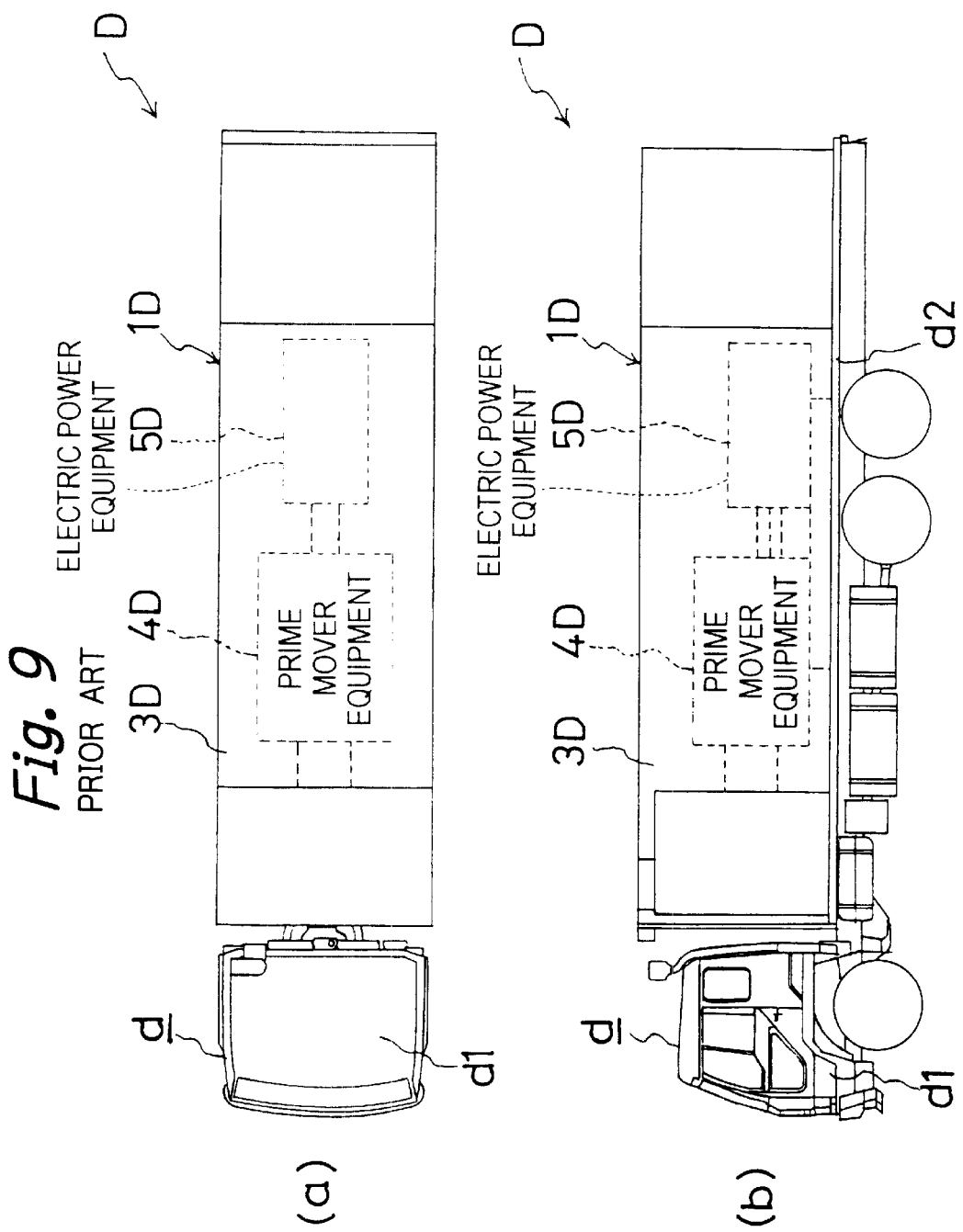

METHOD FOR INSTALLING AND REMOVING AUTOMATIC LIFT-TYPE MOBILE FACILITY, METHOD OF AUTOMATIC LIFT-TYPE POWER GENERATION, AND AUTOMATIC LIFT-TYPE MOBILE FACILITY

TITLE OF THE INVENTION

Method for Installing and Removing Automatic Lift-Type Mobile Facility, Method of Automatic Lift-Type Power Generation, and Automatic Lift-Type Mobile Facility

BACKGROUND OF THE INVENTION

The present invention relates to a method for installing and removing an automatic lift-type mobile facility adapted to be used for the automatic lifting and lowering operation of a mobile facility which is designed to be mobile for installation at a desired location to accomplish a desired task, an automatic lift-type electric power generation method when said mobile facility is an electric power generation equipment unit, and an automatic lift-type mobile facility which is directly applied for the embodiment of the foregoing.

Mobile power generation equipment has been used in such applications as a power supply on construction sites, a temporary power supply for the duration before normal power supply is available, or an emergency power supply under circumstances where the normal power supply is suspended unexpectedly or expectedly according to a predetermined schedule.

For example, mobile power generation equipment has been used as a means of private power generation for such facilities as fire prevention facilities, public communication systems, flight control systems, medical institutes, nuclear reactors where power failure even for a minimum length of time is permitted for their social responsibilities. In these applications, normal power supply is switched to emergency power supply when a power failure occurs and then switched back when the normal power supply is resumed.

However, in order to maintain the normal performance of the emergency power supply mentioned above, periodical inspection of the emergency power supply and servicing for adjustment and repair of affected parts and functions are necessary, which inevitably interrupts the availability of the emergency power supply since such servicing work, requiring an overhaul of the emergency power supply equipment, may require a minimum of one day and a maximum of 10 days. During such suspended use of the emergency power supply equipment due to servicing, mobile power generation equipment is used as the substitute for said emergency power supply equipment.

For installing said mobile power generation equipment at a desired location demanding a power supply, mobile power generation equipment is loaded onto a carrying vehicle such as a standard motor-truck, large lorry, or trailer in accordance with the weight and size of said equipment. When loading the mobile power generation equipment onto such a carrying vehicle at the storage or shipping plant, slinging work with necessary slinging materials must be performed by slinging operators and then a mobile crane which is a load handling system must be operated by a crane operator.

After loading the equipment onto a carrying vehicle, the vehicle is driven by a driver to transport the mobile power generation equipment, to a desired location of use. Then the mobile power generation equipment is installed at said location by stinging the equipment with slinging materials and with slinging operators in attendance and unloading said equipment by the use of a crane operated by an operator.

In the same manner, when removing the mobile power generation equipment from said desired location of use, slinging work with necessary slinging materials must be performed by slinging operators and then a mobile crane must be operated by a crane operator to load said equipment onto a carrying vehicle such as a standard motor-truck, large lorry, or trailer. After that said equipment is transported to said storage plant on the carrying vehicle.

In addition to the examples described above, a mobile power-supply vehicle D provided with power generation equipment and a vehicle as an integrated unit, which falls under a special vehicle category, as shown in FIG. 9 has been used. FIG. 9 is an internal view of a conventional mobile power-supply vehicle, with (a) and (b) being top view and side view respectively.

The mobile power-supply vehicle D comprises a driver's cab d1 provided on a truck body d which transports said power generation equipment, and a power generation section 1D which is loaded integrally on the load-carrying platform d2 and generates electric power. The power generation section 1D includes a cubicle 3D which is a housing, prime mover equipment 4D which supplies prime mover for electric power supply, and electric power equipment 5D which generates electricity by using the prime mover supplied by the prime mover equipment 4D and supplies electricity as demanded.

The mobile power-supply vehicle D does not require procedures such as the loading or unloading of any item at a desired location of use of the system. Installation of the power generation section 1D is completed by parking the mobile power-supply vehicle D itself in place.

The description above is related to mobile power generation equipment, however, other mobile facilities such as test equipment including a liquid rheostat, containers or other casing mechanism, mobile zoo or amusement, mobile swimming pool or hot spring, mobile shops, and other types of mobile structures, mobile displays at trade shows or the like have been loaded, transported, unloaded, installed, and removed in the same way, supported by slinging work with necessary slinging materials, with slinging operators in attendance and a mobile crane or other type of load handling system operated by a crane operator as well.

There are some cases where said mobile facility and carrying vehicle are integrated, for example, truck campers.

In the use of a conventional mobile power generation equipment unit, however, a load handling system as, well as slinging materials are necessary, which has created a problem in that the size of the system becomes extremely large. In addition, further problems in connection with the necessity of having a crane operator and slinging operators in addition to the driver of the carrying vehicle. In particular, it is becoming increasingly difficult to secure a crane operator since the operator has to possess an operating license.

When a crane is used, the operation runs the risk of endangering operators as well as equipment and facilities on the operation site due to the risk of a crane toppling or a load falling off the crane. Furthermore, if the carrying vehicle should break down on its way to the desired location of use and a new vehicle should be dispatched to the point of breakdown, a crane must also be dispatched for extra unloading and loading procedures.

With the size of mobile power generation equipment unit having been increased, the carrying vehicle must also be larger. As a result, the roads and the route to be taken by the vehicle for transportation are limited, or in the worst case the transportation plan itself becomes difficult to accomplish. In the same way, with the size of mobile power generation equipment unit having been increased, the operation area must become proportionally larger and the ground must be cured sufficiently to be firm enough to support the whole system.

Furthermore, when a large mobile power generation equipment unit is specified for installation, problems arise in that it is very hard to secure said mobile power generation equipment unit itself since the number of large systems is limited and the transportation distance becomes extremely long in connection with the difficulty in securing such system. In addition to these problems, when a crane is used, the operation runs the risk of endangering operators as well as equipment and facilities on the operation site. So it is impossible to install such mobile facilities at a place where no crane operation is permitted.

The problems mentioned above are related to mobile power generation equipment, however, the same type of problems apply to other mobile facilities. For example, mobile facilities with outriggers provided at four corners of a container are divided into two types. One is with outriggers attached to the corners of the container, with said outriggers protruded. The other type is with the outriggers accommodated into recesses created at the four corners of the container body, with the recesses extending the full height of the respective containers. When these types of containers are stacked together with other conventional containers without outriggers, the first type of containers are just a hindrance to the others and the second type is subject to lower structural strength due to different construction relative to the former type. In both cases, these types of containers must be excluded from stacked container storage. So these types of mobile facilities cannot be transported or stored at a relay station in stack fashion together with conventional containers. They must each be transported or handled independently, which disqualifies them as marine-transport containers or land-transport containers.

Another problem with mobile power-supply vehicles is that they cannot use some public roads if the size and weight of the carrying vehicle is increased in accordance with the enlarged power generation section just as in the case of the mobile power generation equipment unit mentioned above.

Although, a mobile power-supply vehicle serve is a highly effective first measure in the event of an unexpected power failure, it is more often than not placed in a standby condition at a storage plant for long periods of time. Even if daily inspections and startup tests are conducted, it is rarely put into actual operation. So it is often the case that it develops failures once it is mobilized.

Furthermore, if the mobile power-supply vehicle breaks down on its way to the destination, unless a substitute mobile power-supply vehicle is dispatched, said trouble-ridden vehicle has to remain where it is until repaired. It is also necessary for the vehicles to undergo a compulsory official safety inspection of the car once a year or two years. It will then be put out of service during said inspection and servicing if any is incidental to said official inspection.

In addition, since each vehicle for the power generation section of a mobile power-supply vehicle is designed, structured, and manufactured individually in accordance with the dimensions and weight of the power generation section, the power generation section cannot be installed onto any other vehicle than the one for which it has been specifically designed. An attempt can be made to load the power generation section onto a different vehicle but it may be a very difficult arrangement with many assembly fixtures required. With regard to the legal procedures related to the arrangement above, official registration and inspection to change the structure of the vehicle are required.

The life of a mobile power-supply vehicle is equal to that of the carrying vehicle or the power generation section, whichever is shorter. Even if one of them is still usable, for example, if the carrying vehicle has to be put out of service due to emission controls or the like, both the power generation section and the carrying vehicle have to be discarded. So it is impossible to install a mobile power-supply vehicle at a place where no sufficient space is available.

The problems mentioned above are related to mobile power-supply vehicles, however, the same type of problems apply to mobile facilities designed to be integral with carrying vehicles respectively.

With the size and weight of said mobile power generation equipment unit and said mobile power-supply vehicle increased in accordance with increased output level, the electricity demand is often met by installing only one system on the site. The greater increase in the size and weight of said mobile power generation facility or said mobile power-supply vehicle, the more difficult it becomes to secure a suitable one for each need. In addition, the transportation of a system with an unusual size and weight is subject to limitations in terms of the use of public roads.

In connection with the above, electric power generation by a single power system often results in an inefficient supply of power due to the fact that the fuel consumption for lower (or no) loads remains almost, the same even if the demand is comparatively lower than the maximum output level of the system.

Furthermore, in said mobile power generation equipment unit and said mobile power-supply vehicle, the output, cannot be selected between 50 Hz or 60 Hz as desired. Each unit is designed to output on either one of these frequency levels. In other words, such systems cannot be commonly used between districts with two different frequencies.

SUMMARY OF THE INVENTION

With all the problems mentioned above, major objects of the present invention are listed below.

A first object of the present invention is to provide a method for installing and removing an automatic lift-type mobile facility and an automatic lift-type mobile facility, whereby the mobile facility is easily installed or removed to and from a desired place including such procedures as loading or unloading said mobile facility onto or from a carrying vehicle such as a standard motor-truck or trailer.

A second object of the present invention is to provide a method for installing and removing an automatic lift-type mobile facility, a method of automatic lift-type power generation, and an automatic lift-type mobile facility which can reduce the constraints of transportation roads on the carrying vehicles for the mobile facilities.

A third object of the present invention is to provide a method for installing and removing the automatic lift-type mobile facility, a method of automatic lift-type power generation, and an automatic lift-type mobile facility which can install said mobile facility horizontally even if the ground on the installation site at the desired location of use is so soft or uneven that it must be cured otherwise.

A fourth object of the present invention is to provide a method for installing and removing an automatic lift-type mobile facility, a method of automatic lift-type power generation, and an automatic lift-type mobile facility which can supply electric power efficiently.

A fifth object of the present invention is to provide a method for installing and removing an automatic lift-type mobile facility, a method of automatic lift-type power generation, and an automatic lift-type mobile facility which can generate electric power applicable to districts with different frequencies.

Other objects of the present invention will become apparent from the descriptions included in the specification and the accompanying drawings, especially the respective appended claims.

An apparatus of the present invention, in order to solve the problems mentioned above, is an automatic lift-type mobile facility comprising a mobile facility which completes a desired operation at a desired location of use and an automatic lifting-and-lowering section being integral with said mobile facility and being able to carry said mobile facility on itself, having outriggers which can be horizontally extended or retracted to and from the center position of either one side or both sides of said section, jacks which are housed inside the leg sections of said outriggers and can be extended or retracted vertically downward or upward to and from said leg sections, and universal casters which can bob up and down so as to freely control the directional adjustment of said mobile facility by being moved back and forth or rotated clockwise or counterclockwise.

A method of the present invention, in order to solve the problems mentioned above, includes installing and removing procedures comprising automatic lifting and lowering operations executed with remote control by radio, directional adjustment of said automatic lift-type mobile facility by being moved back and forth or rotated clockwise or counterclockwise by casters, further comprising the loading of said automatic lift-type mobile facility onto a carrying vehicle by said automatic lifting and lowering operations at the storage plant of said mobile facility, transporting said automatic lift-type mobile facility to a desired location of use, unloading and installing said automatic lift-type mobile facility by said automatic lifting and lowering operations at said desired location of use, loading said automatic lift-type mobile facility onto a carrying vehicle by said automatic lifting and lowering operations at said location of use, transporting said automatic lift-type mobile facility back to the storage plant, and unloading said automatic lift-type mobile facility by said automatic lifting and lowering operations at the storage plant.

A method of the present invention, in order to solve the problems mentioned above, includes a power generation procedure adapted to supply electricity to a desired purpose, comprising generating electric power by using an automatic lift-type power generation equipment unit solely which is one of said mobile facilities or, generating electric power by operating a plurality of automatic lift-type power generation equipment units connected in parallel and outputting electricity by synchronizing, sharing load, and adding the respective outputs from said power generation equipment units connected in parallel, further by selecting either 50 Hz or 60 Hz frequency as desired, with said automatic lift-type power generation automatically starting or stopping the operation of power generation and power supply in accordance with the availability of a fixed power supply.

More specifically, in order to solve the problems mentioned above, the present invention, is practiced by using novel constituent methods and means whose features are listed below, including generic and more specific concepts.

That is, a first feature of the method of the present invention resides in a method for installing and removing an automatic lift-type mobile facility comprising steps of: installing a mobile facility intended to accomplish a desired task at a desired location of use; and removing the mobile facility from the desired location after completion of the desired task, wherein the method comprises steps of: introducing the automatic lift-type mobile facility comprising the mobile facility and automatic lifting-and-lowering means; and automatically lifting and lowering the automatic lift-type mobile facility to a desired height by controlling the automatic lifting-and-lowering means.

A second feature of the method of the present invention resides in a method for installing and removing an automatic lift-type mobile facility which has the first feature of the method mentioned above, wherein the step of installing the mobile facility at the desired location comprises steps of: selecting optimal combination of the automatic lift-type mobile facility and a carrying vehicle; loading the automatic lift-type mobile facility onto the carrying vehicle at a storage plant of the automatic lift-type mobile facility; transporting the automatic lift-type mobile facility to the desired location with the carrying vehicle; and unloading the automatic lift-type mobile facility from the carrying vehicle at the desired location, and the step of removing the mobile facility from the desired location comprises steps of loading the automatic lift-type mobile facility onto the carrying vehicle at the desired location; transporting the automatic lift-type mobile facility to the storage plant with the carrying vehicle; and unloading the automatic lift-type mobile facility from the carrying vehicle at the storage plant.

A third feature of the method of the present invention resides in a method for installing and removing an automatic lift-type mobile facility which has the first or second feature of the method mentioned above, wherein the automatic lift-type mobile facility comprises the mobile facility and the automatic lifting-and-lowering means which are inseparably structured each other.

A fourth feature of the method of the present invention resides in a method for installing and removing an automatic lift-type mobile facility which has the first or second feature of the method mentioned above, wherein the automatic lift-type mobile facility allows the mobile facility to be detached when loaded onto the automatic lifting-and-lowering means.

A fifth feature of the method of the present invention resides in a method for installing and removing an automatic lift-type mobile facility which has the fourth feature of the method mentioned above, wherein the step of selecting the optimal combination of the automatic lift-type mobile facility and the carrying vehicle is executed by selecting the mobile facility loaded onto the automatic lifting-and-lowering means and the carrying vehicle, and the step of loading the automatic lift-type mobile facility onto the carrying vehicle at the storage plant and the step of unloading the automatic lift-type mobile facility from the carrying vehicle at the desired location are executed by handling the automatic lifting-and-lowering means and the mobile facility as an inseparable single body.

A sixth feature of the method of the present invention resides in a method for installing and removing an automatic lift-type mobile facility which has the second feature of the method mentioned above, wherein the step of selecting the optimal combination of the automatic lift-type mobile facility and the carrying vehicle is executed by employing conditions inclusive of the level of electric demand, the width and weight limitations of a road used for transportation, the dimensions and weight of the carrying vehicle, and the dimensions and weight of an automatic lift-type power generation equipment unit.

A seventh feature of the method of the present invention resides in a method for installing and removing an automatic lift-type mobile facility which has the sixth feature of the method mentioned above, wherein the storage plant comprises an automated warehouse automatically executing selection of the automatic lift-type mobile facility stored and arranged in accordance with the conditions therein and the carrying vehicle, the selection of the automatic lift-type mobile facility and the carrying vehicle being managed and controlled on the basis of computer calculations by data inputs regarding the conditions in order to meet a desired schedule for executing the step of selecting the optimal combination of the automatic lift-type mobile facility and the carrying vehicle, and the step of loading the automatic lift-type mobile facility onto the carrying vehicle at the storage plant and the step of unloading the automatic lift-type mobile facility from the carrying vehicle at the storage plant is mechanically executed by positioning the automatic lift-type mobile facility in a predetermined place on the basis of the computer calculations.

An eighth feature of the method of the present invention resides in a method for installing and removing an automatic lift-type mobile facility which has the second, sixth or seventh feature of the method mentioned above, wherein the step of loading the automatic lift-type mobile facility onto the carrying vehicle comprises steps of: operating the automatic lifting-and-lowering means provided in the automatic lift-type mobile facility; driving a load-carrying platform of the carrying vehicle directly underneath the automatic lift-type mobile facility; and operating the automatic lifting-and-lowering means, and the step of unloading the automatic lift-type mobile facility from the carrying vehicle comprises steps of:operating the automatic lifting-and-lowering means provided in the automatic lift-type mobile facility loaded onto the carrying vehicle; driving the load-carrying platform of the carrying vehicle out from under the automatic lift-type mobile facility; and operating the automatic lifting-and-lowering means.

A ninth feature of the method of the present invention resides in a method for installing and removing an automatic lift-type mobile facility which has the first, second, sixth or seventh feature of the method mentioned above, wherein the steps of installing and removing the automatic lift-type mobile facility are executed by freely controlling directional adjustment of the automatic lift-type mobile facility as moved back and forth and rotated clockwise or counterclockwise by wheeling means provided in the automatic lifting-and-lowering means included in the automatic lift-type mobile facility.

A tenth feature of the method of the present invention resides in a method for installing and removing an automatic lift-type mobile facility which has the first, second, sixth or seventh feature of the method mentioned above, wherein the step of automatically lifting the automatic lift-type mobile facility is executed by extending an outrigger of the automatic lifting-and-lowering means from each side of the automatic lifting-and-lowering means and extending a jack housed retractably in an outrigger leg section downward, the step of lowering the automatic lift-type mobile facility is executed by retracting the jack and retreating the outrigger back into the each side of the automatic lifting-and-lowering means.

An eleventh feature of the method of the present invention resides in a method for installing and removing an automatic lift-type mobile facility which has the first feature of the method mentioned above, wherein the step of lowering the automatic lift-type mobile facility is executed by finally receiving the jack in an accommodating recess provided in the automatic lifting-and-lowering means.

A twelfth feature of the method of the present invention resides in a method for installing and removing an automatic lift-type mobile facility which has the tenth feature of the method mentioned above, wherein the step of installing the mobile facility is executed by adjusting the extension length of the jack and accordingly adjusting the lifting height of the mobile facility.

A thirteenth feature of the method of the present invention resides in a method for installing and removing an automatic lift-type mobile facility which has the tenth feature of the method mentioned above, wherein the step of installing the mobile facility is executed, with a plurality of the jacks provided in the automatic lifting-and-lowering means, by securing the horizontal balance of the mobile facility by adjusting each extension length of the jacks when the surface of the desired location is uneven or not horizontal.

A fourteenth feature of the method of the present invention resides in a method for installing and removing an automatic lift-type mobile facility which has the second, sixth or seventh feature of the method mentioned above, wherein the step of installing the mobile facility is executed with the carrying vehicle parked in place with the automatic lift-type mobile facility loaded onto the carrying vehicle, without unloading the automatic lift-type mobile facility from the carrying vehicle, and the step of removing the mobile facility is executed by driving the carrying vehicle off from the desired location with the automatic lift-type mobile facility as it is, loaded onto the carrying vehicle.

A fifteenth feature of the method of the present invention resides in a method for installing and removing an automatic lift-type mobile facility which has the second, sixth or seventh feature of the method mentioned above, wherein the mobile facility comprises one of a marine-transport container and a land-transport container, each of the containers being capable of stacking vertically, and the steps of transporting the automatic lift-type mobile facility to the desired location and to the storage plant are executed correspondingly with one of a cargo ship and a cargo train.

A sixteenth feature of the method of the present invention resides in a method for installing and removing an automatic lift-type mobile facility which has the first, second, sixth or seventh feature of the method mentioned above, wherein the mobile facility comprises one of testing equipment inclusive of a water rheostat, a mobile structure, a mobile display item for a device and the like, a casing mechanism inclusive of a container, and a power generation section generating and supplying electric power.

A seventeenth feature of the method of the present invention resides in a method for installing and removing an automatic lift-type mobile facility which has the first, second, sixth or seventh feature of the method mentioned above, wherein the mobile facility comprises power generating means capable of being connected in parallel with each other, the automatic lift-type mobile facility comprises an automatic lift-type power generation equipment unit, and the steps of installing and removing the automatic lift-type mobile facility are executed with a plurality of the automatic lift-type power generation equipment units.

A first feature of the method of the present invention resides in a method of automatic lift-type power generation by employing at least one automatic lift-type power generation equipment unit as an automatic lift-type mobile facility installed at a desired location of use of electric power comprising steps of: generating the electric power by the automatic lift-type power generation equipment unit transported to and installed at the desired location; and supplying the electric power to an end purpose.

A second feature of the method of the present invention resides in a method of automatic lift-type power generation which has the first feature of the method mentioned above, wherein the method comprises a step of introducing a plurality of the automatic lift-type power generation equipment units, the supplying the electric power being executed by connecting the automatic lift-type power generation equipment units in parallel and being adding each of the outputs from each of the automatic lift-type power generation equipment units.

A third feature of the method of the present invention resides in a method of automatic lift-type power generation which has the second feature of the method mentioned above, wherein the step of supplying the electric power is executed by synchronizing each of the outputs.

A fourth feature of the method of the present invention resides in a method of automatic lift-type power generation which has the third feature of the method mentioned above, wherein the step of supplying the electric power is executed by synchronizing phases, voltages and frequencies of the outputs.

A fifth feature of the method of the present invention resides in a method of automatic lift-type power generation which has the second, third or fourth feature of the method mentioned above, wherein the step of supplying the electric power is executed by sharing an electric load between the automatic lift-type power generation equipment units.

A sixth feature of the method of the present invention resides in a method of automatic lift-type power generation which has the first, second, third or fourth feature of the method mentioned above, wherein the step of supplying the electric power is executed by selecting either 50 Hz or 60 Hz for the frequency of the output from the automatic lift-type mobile facility.

A seventh feature of the method of the present invention resides in a method of automatic lift-type power generation which has the first, second, third or fourth feature of the method mentioned above, wherein the step of supplying the electric power comprises steps of automatically actuating power generating operation of the automatic lift-type power generation equipment unit upon suspension of power supply by fixed power supply equipment in accordance with functional availability thereof, and automatically deactivating the power generating operation of the automatic lift-type power generation equipment unit upon recovery of the power supply by the fixed power supply equipment.

An eighth feature of the method of the present invention resides in a method of automatic lift-type power generation which has the first, second, third or fourth feature of the method mentioned above, wherein the step of generating the electric power is executed while cooling power generating means provided in the automatic lift-type power generation equipment unit.

A ninth feature of the method of the present invention resides in a method of automatic lift-type power generation which has the eighth feature of the method mentioned above, wherein the power generating means is cooled with jetting water in executing the step of generating the electric power.

A tenth feature of the method of the present invention resides in a method of automatic lift-type power generation which has the first, second, third or fourth feature of the method mentioned above, wherein the step of generating the electric power is executed by operating a control panel in a control room provided in the automatic lift-type power generation equipment unit, the control panel being operated by at least one operator.

A first feature of the apparatus of the present invention resides in an automatic lift-type mobile facility to be installed at a desired location of use and to be removed from the desired location after completion of a desired task comprising: a mobile facility to be installed at the desired location; and an automatic lifting-and-lowering section automatically lifting and lowering the mobile facility, the automatic lifting-and-lowering section being capable of changing a position of the mobile facility.

A second feature of the apparatus of the present invention resides in an automatic lift-type mobile facility which has the first feature of the apparatus mentioned above, wherein the mobile facility and the automatic lifting-and-lowering section are inseparably structured each other.

A third feature of the apparatus of the present invention resides in an automatic lift-type, mobile facility which has the first feature of the apparatus mentioned above, wherein the mobile facility is detachably loaded onto the automatic lifting-and-lowering section.

A fourth feature of the apparatus of the present invention resides in an automatic lift-type mobile facility which has the first, second or third feature of the apparatus mentioned above, wherein the automatic lifting-and-lowering section comprises: a chassis comprising an underframe; at least one outrigger provided at the middle point on one or both sides of the chassis, the outrigger being extended and retracted horizontally; and a jack attached retractably inside a vertical leg section in the outrigger, the jack being extended and retracted vertically.

A fifth feature of the apparatus of the present invention resides in an automatic lift-type mobile facility which has the first, second or third feature of the apparatus mentioned above, wherein the automatic lifting-and-lowering section includes at least one universal caster capable of bob up and down so as to freely control directional adjustment of the automatic lift-type mobile facility as moved back and forth and rotated clockwise or counterclockwise.

A sixth feature of the apparatus of the present invention resides in an automatic lift-type mobile facility which has the fifth feature of the apparatus mentioned above, wherein the universal caster comprises: at least one wheel; and a power unit for powering the wheel.

A seventh feature of the apparatus of the present invention resides in an automatic lift-type mobile facility which has the first, second or third feature of the apparatus mentioned above, wherein the automatic lifting-and-lowering section includes a controller unit controlling operation of the automatic lifting-and-lowering section.

An eighth feature of the apparatus of the present invention resides in an automatic lift-type mobile facility which has the seventh feature of the apparatus mentioned above, wherein the controller unit comprises a remote control unit operated externally by radio.

A ninth feature of the apparatus of the present invention resides in an automatic lift-type mobile facility which has the first or third feature of the apparatus mentioned above, wherein the automatic lifting-and-lowering section includes a loading base plate onto which the mobile facility is loaded.

A tenth feature of the apparatus of the present invention resides in an automatic lift-type mobile facility which has the first, second or third feature of the apparatus mentioned above, wherein the mobile facility comprises one of testing equipment inclusive of a water rheostat, a mobile structure, a mobile display item for a device and the like, and a casing mechanism inclusive of a container.

An eleventh feature of the apparatus of the present invention resides in an automatic lift-type mobile facility which has the first, second or third feature of the apparatus mentioned above, wherein the mobile facility comprises a power generation section generating and supplying electric power, and the automatic lift-type mobile facility comprises an automatic lift-type power generation equipment unit.

A twelfth feature of the apparatus of the present invention resides in an automatic lift-type mobile facility which has the eleventh feature of the apparatus mentioned above, wherein the power generation section comprises: a cubicle comprising a housing; a prime mover equipment supplying prime mover required for electric power generation, the prime mover equipment, being loaded inside the cubicle; and an electric power equipment generating electric power by utilizing the prime mover provided by the prime mover equipment, the electric power equipment being loaded inside the cubicle.

A thirteenth feature of the apparatus of the present invention resides in an automatic lift-type mobile facility which has the twelfth feature of the apparatus mentioned above, wherein the power generation section includes a door for accessing the inside of the cubicle for the maintenance purpose.

A fourteenth feature of the apparatus of the present invention resides in an automatic lift-type mobile facility which has the twelfth feature of the apparatus mentioned above, wherein the power generation section comprises, in place of the cubicle, one of a marine-transport container for a container ship and a land-transport container for a container train, each of the containers being capable of stacking vertically.

A fifteenth feature of the apparatus of the present invention resides in an automatic lift-type mobile facility which has the eleventh feature of the apparatus mentioned above, wherein the power generation section includes cooling equipment cooling the power generation section itself.

A sixteenth feature of the apparatus of the present invention resides in an automatic lift-type mobile facility which has the fifteenth feature of the apparatus mentioned above, wherein the cooling equipment comprises water-jet-type cooling equipment, the cooling equipment comprising: a cooling section cooling a radiator by spraying water thereto; a tank storing the water for the cooling purpose; and a feed-water port through which the water is supplied to the tank.

A seventeenth feature of the apparatus of the present invention resides in an automatic lift-type mobile facility which has the fifteenth feature of the apparatus mentioned above, wherein the cooling equipment is provided inside the cubicle.

An eighteenth feature of the apparatus of the present invention resides in an automatic lift-type mobile facility which has the eleventh feature of the apparatus mentioned above, wherein the power generation section includes a control panel controlling the power generation section.

A nineteenth feature of the apparatus of the present invention resides in an automatic lift-type mobile facility which has the eighteenth feature of the apparatus mentioned above, wherein the power generation section includes a control room in which the control panel is provided, the control panel being operated by at least one operator.

A twentieth feature of the apparatus of the present invention resides in an automatic lift-type mobile facility which has the eleventh feature of the apparatus mentioned above, wherein the automatic lift-type mobile facility comprises a plurality of automatic lift-type mobile facilities, each of the power generation sections in each of the automatic lift-type mobile facilities being capable of being connected in parallel.

A twenty-first feature of the apparatus of the present invention resides in an automatic lift-type mobile facility which has the twentieth feature of the apparatus mentioned above, wherein the each of the power generation sections in each of the automatic lift-type mobile facilities comprises: a parallel-operated unit operating in parallel by synchronizing the output from each of the electric power equipment in each of the power generation sections and sharing an electric load; and a connecting unit interconnecting each of the electric power equipment in each of the power generation sections.

A twenty-second feature of the apparatus of the present invention resides in an automatic lift-type mobile facility which has the eleventh feature of the apparatus mentioned above, wherein the power generation section includes a frequency switch for selecting either 50 Hz or 60 Hz for the output.

A twenty-third feature of the apparatus of the present invention resides in an automatic lift-type mobile facility which has the eleventh feature of the apparatus mentioned above, wherein the power generation section includes an automatic actuating and deactivating unit automatically actuating and deactivating power generating operation in accordance with functional availability of a fixed power supply.

A twenty-fourth feature of the apparatus of the present invention resides in an automatic lift-type mobile facility which has the ninth feature of the apparatus mentioned above, wherein the universal caster is attached on one of the chassis and the loading base plate in such a manner that the universal caster is capable of being retracted inside a caster housing.

BRIEF DESCRIPTION OF THE DRAWINGS

While the specification concludes with claims particularly pointing out and distinctly claiming the subject matters of the present invention, it is believed the present invention will be better understood from the following description taken in connection with the accompanying drawings in which:

FIG. 7 shows a shematic representation of the automatic lifting-and-lowering section provide in the automatic lift-type power generation equiment unit according to apparatus example 2, diagraming the manner of automatic operation thereof, wherein figure (a) shows a top view, figure (b) shows a side view, and figure (c) shows a top view, figure (b) shows a side view, and figure (c) shows a detail of a motorized caster;

FIG. 9 shows an internal view of a conventional mobile power-supply vehicle, wherein figure (a) shows a top view and figure (b) shows a side view.

DETAILED DESCRIPTION OF THE INVENTION

With reference to the accompanying drawings, the modes for carrying out the invention represented herein by the embodiment examples for the methods and mechanisms in the present invention are described below, including apparatus example 1, installation and removal method example 1 which relates directly to said apparatus example 1; apparatus example 2, installation and removal method example 2 which relates directly to said apparatus example 2; apparatus example 3, installation and removal method example 3 which relates directly to said apparatus example 3, and a power generation method example which relates directly to said apparatus example 3.

<Apparatus Example 1>

Apparatus example 1 is described below with reference to FIG. 1 through FIG.4.

An automatic lift-type power generation equipment unit A, which is one of the mobile facilities according to the apparatus example 1, comprises the power generation section 1A which generates and supplies electricity and the self-driven automatic lifting-and-lowering section 2A, wherein said power generation section 1A and automatic lifting-and-lowering section 2A are structured as an integral unit such that the automatic lift-type power generation equipment unit A is regarded as power generation section 1A provided with the automatic lifting-and-lowering section 2A and wherein the automatic lift-type power generation equipment unit is loaded or unloaded onto or off the load-carrying platform 1a of the motor-truck a as desired which is a normal-size or large motor-truck.

The automatic lift-type power generation equipment unit A is designed to integrate the power generation section 1A into a single body unit with the automatic lifting-and-lowering section 2A, which results in excellent characteristics with respect to the dimensions, weight, strength, layout, etc. In addition, the automatic lift-type power generation equipment unit A may be loaded on carrying vehicles other than normal carrying vehicle a, such as a trailer.

The power generation section 1A comprises a cubicle 3A which is a casing mechanism, prime mover equipment 4A which is built into said cubicle 3A and supplies the prime mover for power generation, and electric power equipment 5A which receives the prime mover from said prime mover equipment 4A and generates and supplies electricity for the desired purpose.

The automatic lifting-and-lowering section 2A comprises a chassis 6A, which is shorter than the length of cubicle 3A, which is the installation frame of the automatic lifting-and-lowering section 2A, four outriggers 7A which are installed at the four corners of said chassis 6A and horizontally extendable, and jacks 8A which are installed at the ends of the respective said outriggers 7A and used to adjust the vertical position of said power generation section 1A.

The cubicle 3A comprises jack accommodating recesses 9A which accommodate jacks 8A in their retracted condition and keeps them in standby condition.

Figure 1:
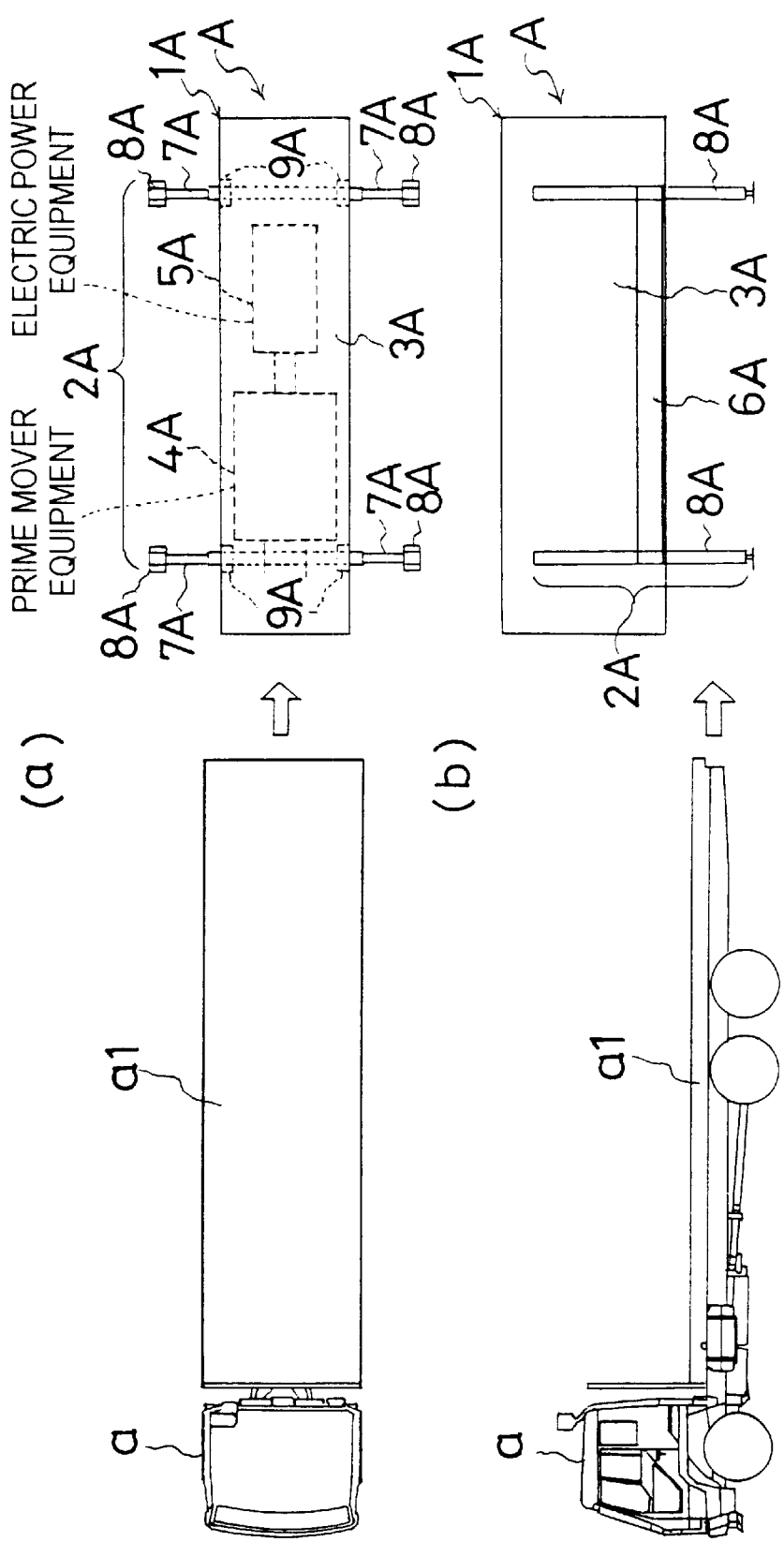
FIG. 1 shows the loading process for an automatic lift-type power generation equipment unit according to apparatus example 1, an embodiment of the invention, wherein figure (a) shows a top view and figure (b) shows a side view.
Figure 2:
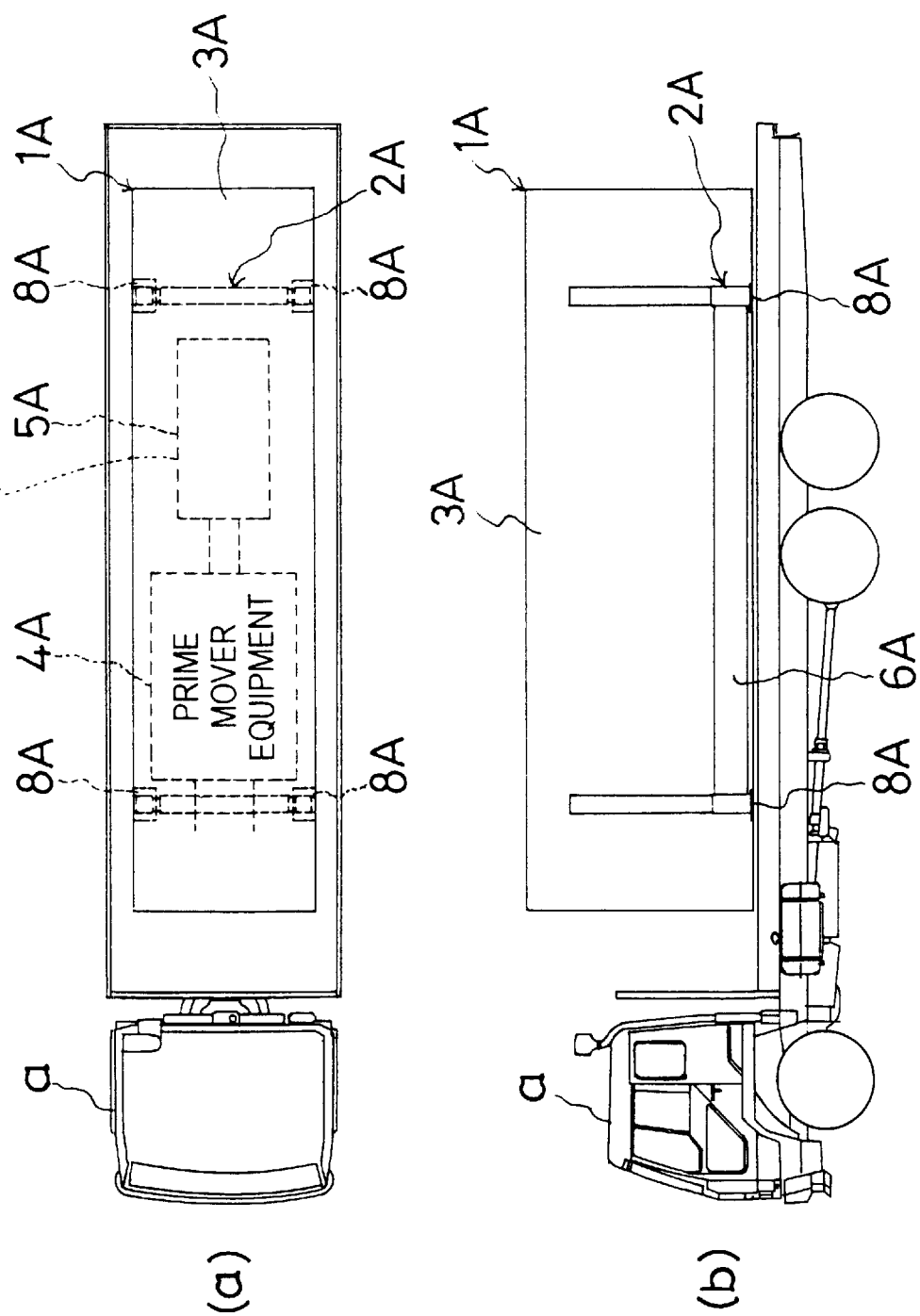
FIG. 2 shows the loading condition of an automatic lift-type power generation equipment unit according to apparatus example 1, wherein figure (a) shows a top view and figure (b) shows a side view.
Figure 3:
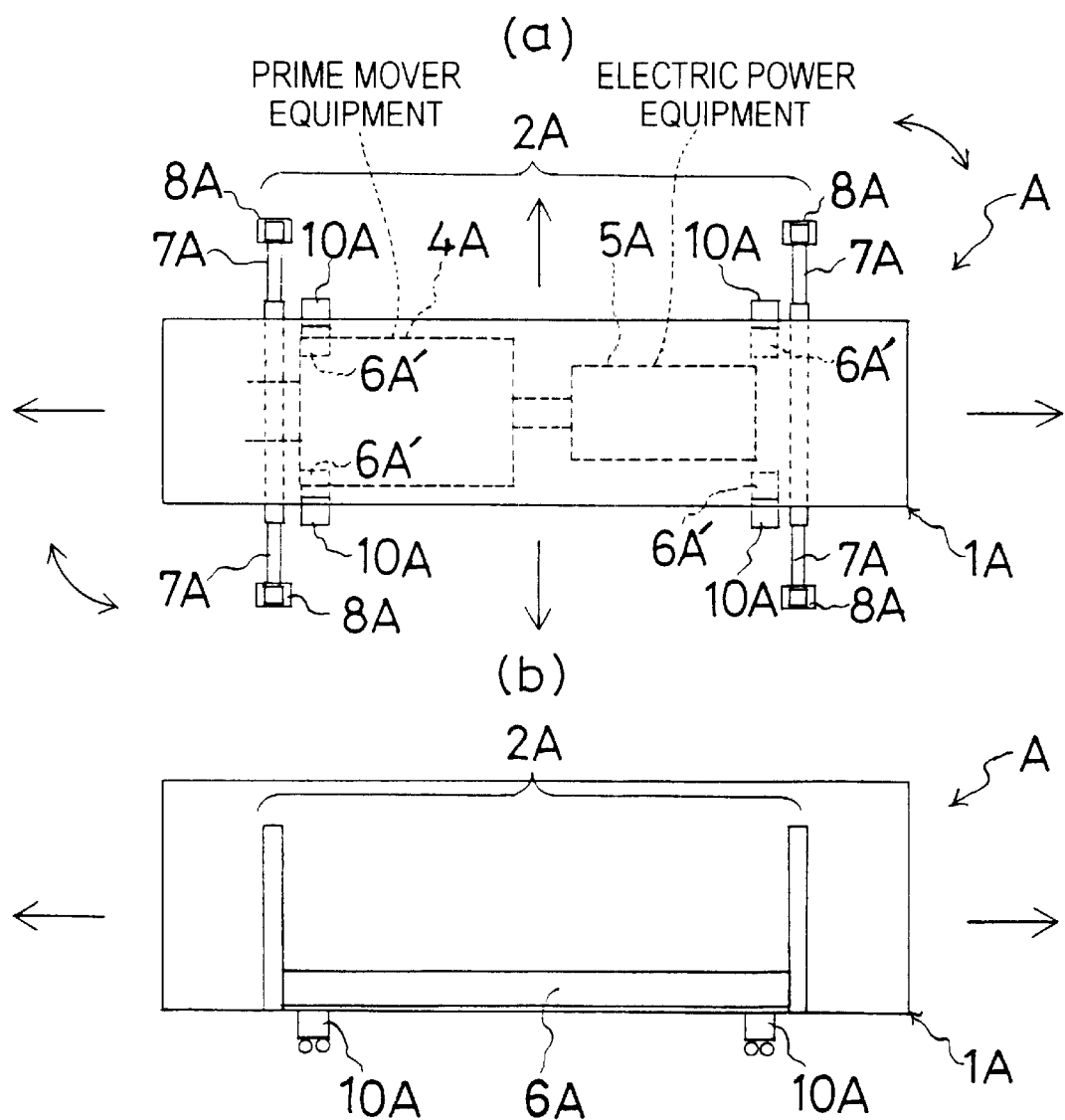
FIG. 3 shows the manner of automatic operation of an automatic lift-type power generation equipment unit according to apparatus example 1, wherein figure (a) shows a top view and figure (b) shows a side view.

With reference to FIG. 3, the chassis 6A is provided with universal casters 10A so as to give free back-and-forth movement to the automatic lifting-and-lowering section 2A as well as allowing the automatic lifting-and-lowering section 2A to follow any unevenness of the ground's surface with the up and down bobbing motion of said casters.

The universal casters 10A, for example, allow the automatic lift-type power generation equipment unit A to move back and forth or to rotate clockwise or counterclockwise to change the direction of movement as desired by the power of the hydraulic system provided by the vertical shaft or wheel shaft, wherein the driving power may be provided by installing a power unit inside each wheel of said casters.

In addition to the examples mentioned above, with reference to FIG. 4, the automatic lift-type power generation equipment unit A2 using the marine-transport. container 11A applicable to marine transportation or land transportation and load handling procedures related to said transportation or a land-transport container applicable to cargo trains or land transportation and load handling procedures related to said transportation may be used in place of said cubicle 3A for power generation section 1A. The outriggers 7A and universal casters 10A of the marine-transport container 11A or land-transport container are installed on both sides, as internally as possible, of the rectangular chassis 6A whose length and width are a little smaller than those of the marine-transport container 11A or land-transport container so as to allow the universal casters 10A to serve more efficiently than those installed at the four corners of the marine-transport container 11A or land-transport container.

Though not represented in any of the figures, the automatic lifting-and-lowering section 2A has a control unit installed inside cubicle 3A or on chassis 6A which controls the operation of the automatic lifting-and-lowering section 2A so that automatic lifting-and-lowering section 2A is controlled manually or externally by radio by a remote control unit provided.

The above descriptions relate to apparatus example 1, wherein the power generation section 1A provided in the automatic lifting-and-lowering equipment unit A is a power generation unit. However, the mobile facility may be one for testing equipment with at least one water rheostat, a casing mechanism which includes containers, a mobile structure or the like to be installed at the location of use, wherein the mobile facility is structured to be integral with the automatic lifting-and-lowering section 2A for a variety of applications.

<Installing and Removing Method Example 1>

This method example is applied to apparatus example 1 and is described below with reference to FIG. 1 through FIG. 4 as in the case of apparatus example 1 above.

In this method example, the installing and removing method, for executing power generation at the desired location of use which is distanced from the storage plant of said automatic lift-type power generation equipment unit A, according to the present invention comprises a series of procedures including loading said automatic lift-type power generation equipment unit A onto said motor-truck a at the storage plant, transporting said automatic lift-type power generation equipment unit A to said desired location of use, installing said automatic lift-type power generation equipment unit A at said desired location of use, loading said automatic lift-type power generation equipment unit A back onto said motor-truck a at said desired location of use, transporting said automatic lift-type power generation equipment unit A to the storage plant, and unloading said automatic lift-type power generation equipment unit A at the storage plant.

The first procedure in this method example according to the present invention is to install the automatic lift-type power generation equipment unit A at the desired location of use. The optimum combination of said automatic lift-type power generation equipment unit and said carrying vehicle is selected manually or automatically by computer on the basis of conditions which include the level of electric demand, the width and weight limitations of the roads used for transportation, the dimensions and weight of said carrying vehicle, the dimensions and weight of said automatic lift-type power generation equipment unit in accordance with the operation schedule.

The following descriptions relate to an example wherein the automatic lift-type power generation equipment unit A and a motor truck a are selected as the optimum combination mentioned above.

The automatic lift-type power generation equipment unit A is loaded onto the motor-truck a. The correct loading position is determined by adjusting the direction using the universal casters 10A which are installed on the chassis 6A and retracted inside caster housings 6A' when loaded onto said motor-truck, wherein said universal casters can provide free back-and-forth movement and follow any unevenness of the ground's surface with the up and down bobbing motion at each fixed point for loading and unloading. Then, the outriggers 7A are extended horizontally and the jacks 8A are extended vertically to automatically lift the mobile power generation equipment unit, A. In this step, the universal casters 10A are rotated by 90 degrees to be raised up by the hydraulic drive system as required.

Then, the load-carrying platform of the motor-truck a is driven to a position directly underneath the automatic lift-type power generation equipment unit A. Jacks 8A and outriggers 7A are retracted to be accommodated inside the accommodating recesses 9A. At the same time, universal casters 10A are rotated and retracted inside the caster housings 6A'. Next, the automatic lift-type power generation equipment unit A is automatically lowered so as to be loaded onto the motor-truck a. Otherwise, the automatic lift-type power generation equipment unit A may be transferred to the loading point using the automatic carrier system provided in a computer-controlled automated warehouse.

Then, the automatic lift-type power generation equipment unit A is transported to the desired location of use where a supply of electric power is demanded and installed at said location. First, the outriggers 7A are extended horizontally and jacks 8A are extended for automatic lifting operation to lift the automatic lift-type power generation equipment unit A above the load-carrying platform of the motor-truck. Next, the motor-truck a located directly under the automatic lift-type power generation equipment unit A is moved away.

Then, the universal casters 10A are rotated to be raised up and jacks 8A are retracted. Further, outriggers 7A are retracted to be accommodated inside the accommodating recesses 9A for automatic lowering operation. The automatic lift-type power generation equipment unit A is installed in position using universal casters 10A, wherein said universal casters 10A control freely the directional adjustment of said automatic lift-type power generation equipment unit A to be moved back and forth or rotated clockwise or counterclockwise.

The height of the automatic lift-type power generation equipment unit A can be adjusted for installation at the optimum level by extending the outriggers 7A and the jacks 8A. The power generation section 1A can be installed horizontally by adjusting the extension length of each jack 8A when the ground's surface at the desired location of use is not horizontal or even. Then, the power generation section starts power generation and supplies power as desired, for a contracted length of time. After completion of said contract period and the necessity for a power supply ends, the following procedure is executed.

The second procedure in this method example according to the present invention is the removal of the automatic lift-type power generation equipment unit A from said desired location of use. By adopting the above installation steps in reverse order, the automatic lift-type power generation equipment unit A together with chassis 6A is automatically lifted by determining the position by means of the universal casters 10A, wherein said universal casters 10A move back and forth or rotate clockwise or counterclockwise for directional adjustment, and by extending the outriggers 7A horizontally and extending the jacks 8A vertically. At the same time, the universal casters 10A are rotated by 90 degrees to be retracted inside the caster housings 6A'.

Then, the load carrying platform of the motor-truck a is driven to a position directly underneath the automatic lift-type power generation equipment, unit A. The jacks 8A are retracted and the outriggers 7A are retracted to be accommodated inside the accommodating recesses 9A for the execution of automatic lowering operation by which the automatic lift-type power generation equipment unit A is loaded onto motor-truck a.

Then, the automatic lift-type power generation equipment unit A is transported to the fixed loading and unloading point at the storage plant to be unloaded and stored in accordance with fixed storage plant procedures, wherein the outriggers 7A are extended horizontally and the jacks 8A are extended vertically for the execution of automatic lifting operation. Thereafter, motor-truck a is driven out from under the automatic lift-type power generation equipment unit A.

Then, both jacks 8A and outriggers 7A are retracted to be accommodated inside the accommodating recesses 9A for the execution of automatic lowering operation. In an automated warehouse, the automatic lift-type power generation equipment unit A is unloaded and stored at the fixed point for storage by moving and adjusting the direction of said movement using the universal casters 10A which are raised up for operation or by an automatic carrier.

The automatic lift-type power generation equipment unit A may be kept loaded as it is on motor-truck a and the motor-truck a may be parked at the desired location of use for the total duration of the use of the automatic lift-type power generation equipment unit A, wherein the motor-truck with the automatic lift-type power generation equipment unit A on board may be removed together after the said period of use. The back-and-forth movement or directional adjustment by means of the clockwise and counterclockwise rotation of the universal casters 10A can be executed at anytime as required, in addition to the step mentioned above.

Figure 4:
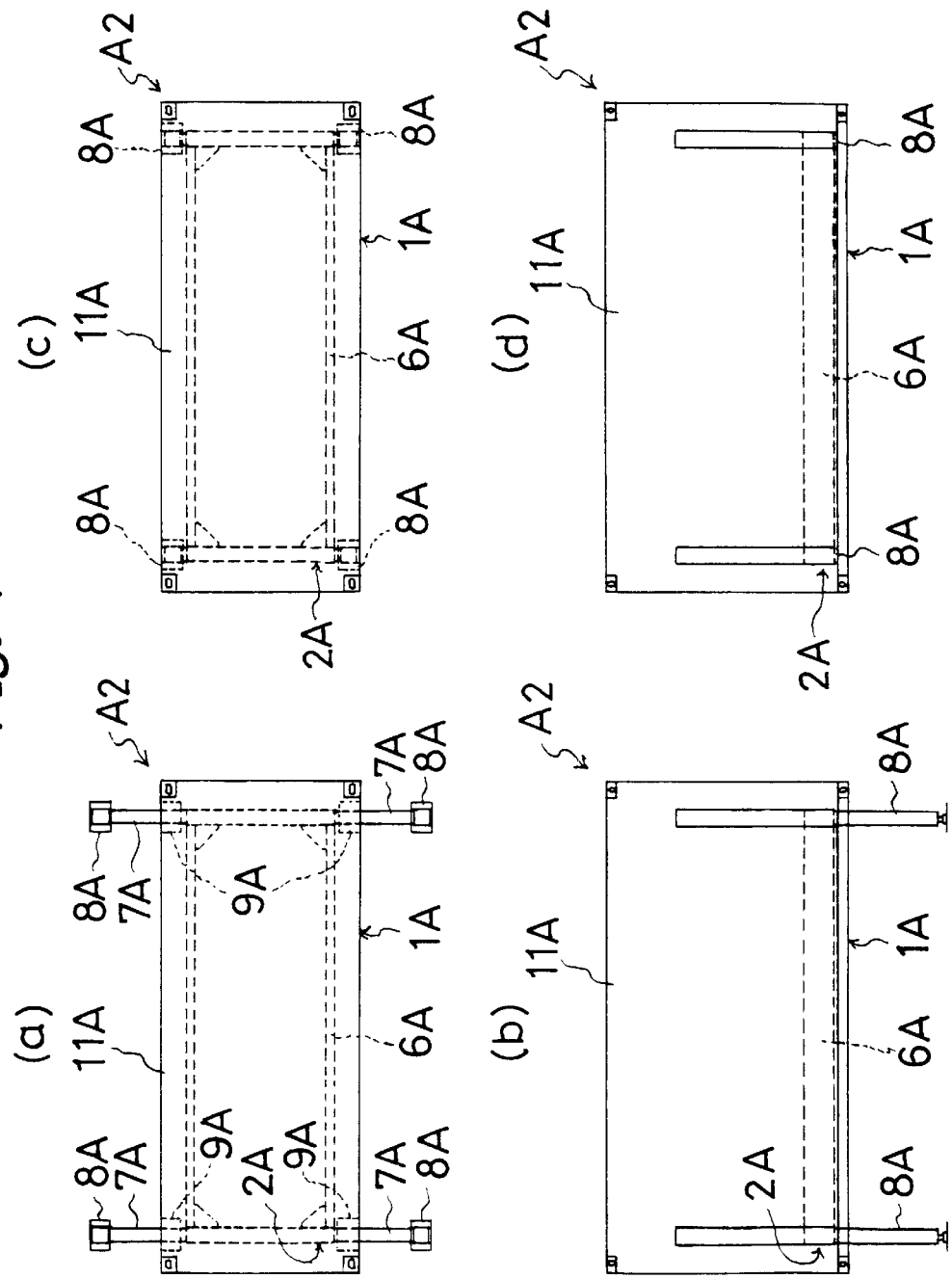
FIG. 4 shows the configuration with a marine-transport container of an automatic lift-type power generation equipment unit according to apparatus example 1, wherein figure (a) shows a top view with said outriggers and jacks extended, figure (b) shows the side view of same, figure (c) shows a top view with said outriggers and jacks retracted, and figure (d) shows the side view of same.

In addition to the example above, the automatic lift-type power generation equipment unit A2 shown in FIG. 4 which uses stackable marine-transport containers in place of cubicle 1A of the power generation section 1A, for marine-transportation, land transportation, and load handling operations related to said transportation, or stackable land-transport containers for railway transportation, land transportation, and load handling operations related to said transportation which may be employed for marine transportation by ship or railway transportation by freight train in addition to motor-truck a for land transportation.

The operations in the automatic lifting-and-lowering section 2A mentioned above, which include movement and directional adjustment using the universal casters 10A, extension and retraction of the outriggers 7A, extension and retraction of the jacks 8A are executed by means of the remote control unit provided in the automatic lifting-and-lowering section 2A, which can be operated by the operator by radio, wherein the operator is protected and is safe from any danger of accident. Since remote control by radio does not require any particular license for operation, even the driver of the carrying vehicle can operate it.

If an automated warehouse is used, said conditions may be input to the computer so that the computer will automatically calculate and determine the optimum combination of an automatic lift-type power generation equipment unit and carrying vehicle, and will load said automatic lift-type power generation equipment unit onto said carrying vehicle for dispatch, or so that said automatic lift-type power generation equipment unit will be stored in said automated warehouse automatically.

Consequently, only the driver of the motor-truck a is necessary for the operation of power supply. A crane for load handling, slinging materials, crane operator, and slinging operators are all unnecessary, making the operation simple and easy. The dangers incidental to crane operation are eliminated. In addition, the remote control operation of the automatic lifting-and-lowering section 2A ensures much easier and safer operation. Furthermore, the required working area is reduced to increase the number of applications available.

Just as in the case of apparatus example 1, the method example described above can be widely applied to any installing and removing method comprising the loading, unloading, and transportation of an automatic lift-type mobile facility, wherein the mobile facility to be installed at the desired location of use is structured to be integral with said automatic lifting-and-lowering section 2A.

<Apparatus Example 2>

Figure 5:
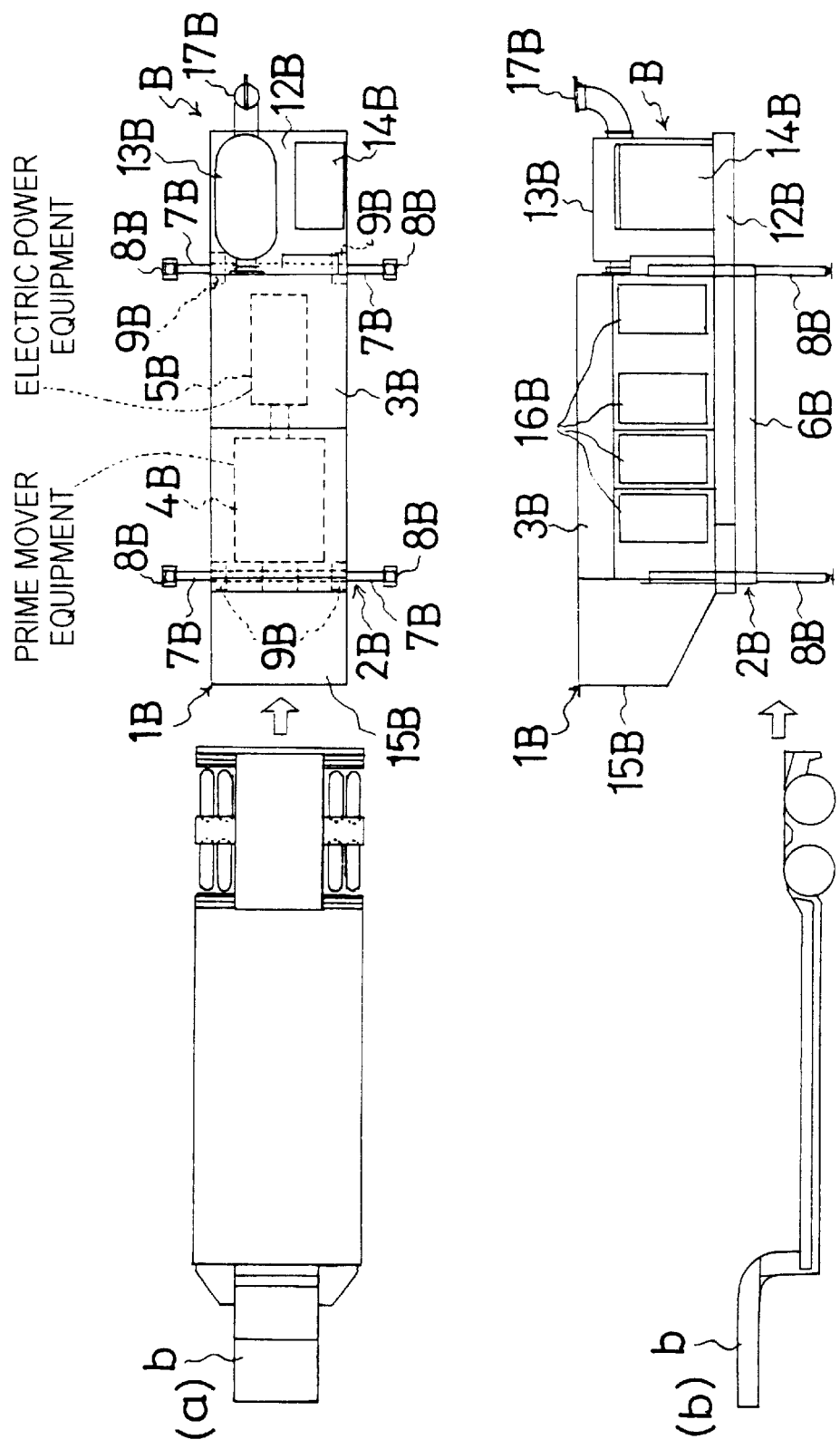
FIG. 5 shows the loading process for an automatic lift-type power generation equipment unit according to apparatus example 2 onto a trailer, wherein figure (a) shows a top view and figure (b) shows a side view.
Figure 6:
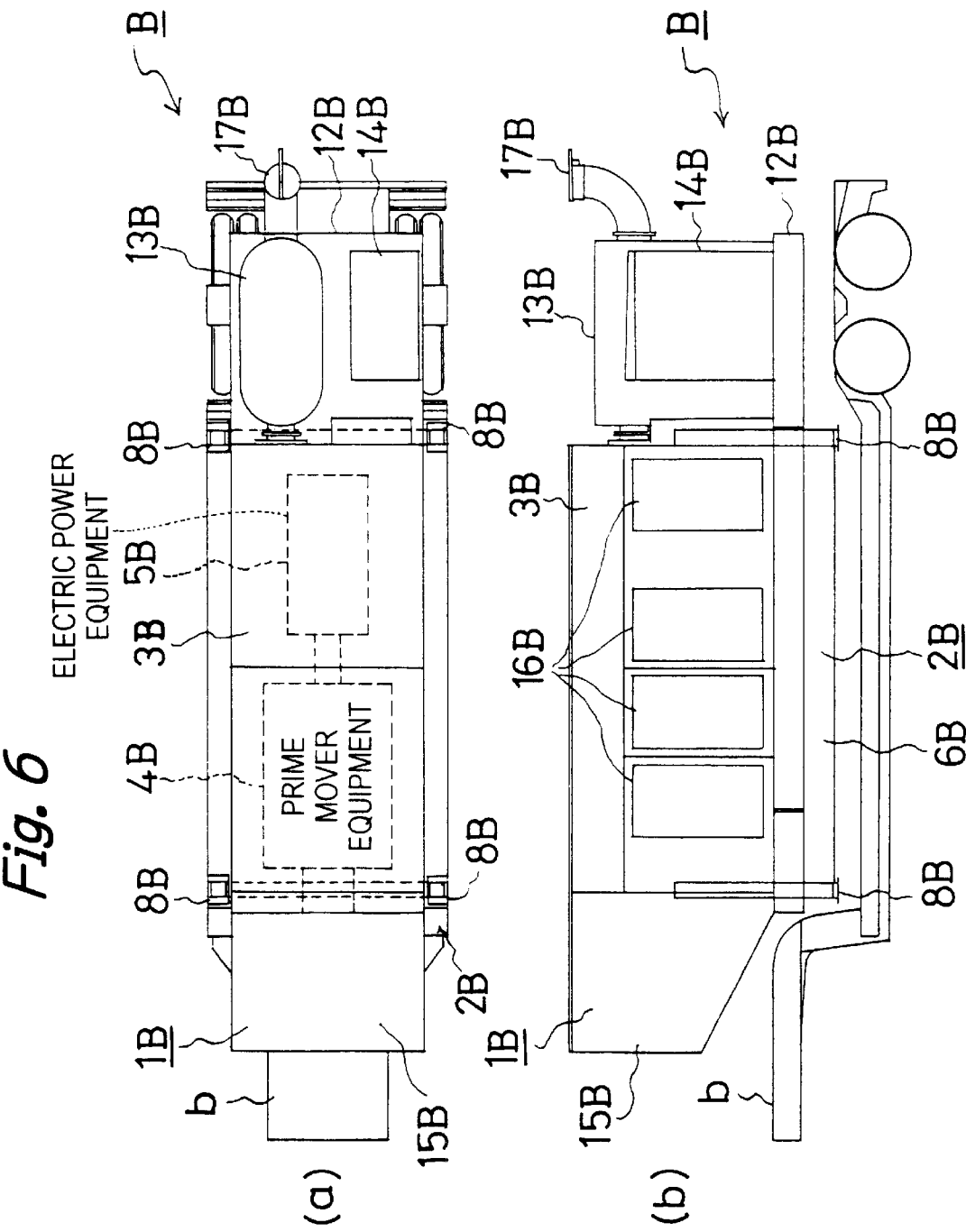
FIG. 6 shows a schematic representation of the installation of an automatic lift-type power generation equipment unit according to apparatus example 2 onto a trailer, wherein figure (a) shows a top view and figure (b) shows a side view.

Apparatus example 2 is described below with reference to FIG. 5 through FIG. 7. The tow tractor of the trailer is omitted from both FIG. 5 and FIG. 6.

An automatic lift-type power generation equipment unit B, which is an independently structured mobile facility, comprises the power generation section 1B which generates and supplies electricity and the self-driven automatic lifting-and-lowering section 2B which automatically lifts or lowers the power generation section 1B, wherein said power generation section 1B is loaded on the 2B which can be easily detached, and wherein said automatic lift-type power generation equipment unit B is loaded on the trailer b.

In the case of the automatic lift-type power generation equipment unit B, the power generation section B is detachably loaded onto the automatic lifting-and-lowering section 2B, however, the power generation section B is not structured to be integral with the automatic lifting-and-lowering section 2B. As a result, the characteristics of apparatus example 2 such as dimensions, weight, strength, layout, and the like are inferior to those of apparatus example 1.

The power generation section 1B comprises cubicle 3B which is a casing mechanism, the prime mover equipment 4B which supplies the prime mover for power generation, the electric power equipment 5B which generates electricity by utilizing the prime mover supplied by the prime mover equipment 4B and supplies electricity as desired, and the loading base plate 12B to be loaded onto the automatic lifting-and-lowering section 2B.

The power generation section 1B further comprises the tank 13B which is attached to cubicle 3B and stores water for a cooling purpose, the control panel 14B which controls the power generation section 1B, the cooling section 15B which is attached to cubicle 3B and executes water-jet spraying for cooling purpose, the doors 16B which are provided in the cubicle 3B and used to service the prime mover equipment 4B and the electric power equipment 5B, and the feed-water port 17B which is attached to the cooling tank 13B through which water is supplied to said tank.

The automatic lifting-and-lowering section 2B comprises a chassis 6B which is shorter than the length of the power generation section 1B which is the outer frame of the automatic lifting-and-lowering section 2B, four outriggers 7B which are installed at the four corners of said chassis 6B and are horizontally extendable, and jacks 8A which are installed at the ends of respective said outriggers 7B and used to adjust the vertical position of said power generation section 1B. Cubicle 3B comprises jack accommodating recesses 9B which accommodate jacks 8B.

Since the automatic lift-type power generation equipment unit B comprises the loading base plate 12B, tank 13B, control panel 14B, cooling section 15B, and feed-water port 17B, the weight of the automatic lift-type power generation equipment unit B according to this apparatus example, is heavier than that of apparatus example 1. The maximum carrying capacity of the vehicle is 4 tons with a normal freight truck, 10 tons with a large freight truck, and 30 tons with a trailer. Apparatus example 2 is not necessarily loaded onto trailer b. It may be loaded onto a freight truck depending upon the applicable weight.

As in the case of apparatus example 1, a marine-transport container for marine-transportation, land transportation, and load handling operations related to said transportation or a land-transport container for railway transportation, land transportation, and load handling operations related to said transportation may be employed, in place of cubicle 3B of the power generation section 1B. As shown in FIGS. 7a and b, the automatic lifting-and-lowering section 2B of the automatic lift-type power generation equipment unit 2B comprises universal casters 10B which follow any unevenness of the ground's surface with the up and down bobbing motion and a remote control unit as in the case of apparatus example 1. Also, by analogy to the apparatus of example 1, universal casters 10B which are installed on the chassis 6B are retractable inside caster housings 6B'. In addition, as shown in FIG. 7c, universal casters 10B include wheels 20B and a power unit 10B' for driving the wheels 20B.

The above descriptions related to apparatus example 2, wherein the power generation section 1B provided in the automatic lifting-and-lowering equipment unit B is a power generation unit as in the case of apparatus example 1. However, the mobile facility may be one for testing equipment with at least one water rheostat, a casing mechanism which includes containers, mobile items of display, a mobile structure or the like to be installed at the location of use, wherein the automatic lift-type mobile facility comprises said mobile facility and said automatic lifting-and-lowering section for a variety of applications, wherein said mobile facility and said automatic lifting-and-lowering section are detachably loaded onto the load-carrying base plate of the carrying vehicle.

<Installing and Removing Method Example 2>

This method example is applied to apparatus example 2 and described below with reference to FIG. 5 through FIG. 7 as in the case of apparatus example 2 above.

In this method example, the installing and removing method, for executing power generation at the desired location of use which is distanced from the storage plant of said automatic lift-type power generation equipment unit B, according to the present invention, comprises a series of procedures including loading said automatic lift-type power generation equipment unit B onto said trailer b at the storage plant, transporting said automatic lift-type power generation equipment unit B to said desired location of use, installing said automatic lift-type power generation equipment unit B at said desired location of use, re-loading said automatic lift-type power generation equipment unit B onto said trailer b at said desired location of use, transporting said automatic lift-type power generation equipment unit B to the storage plant, and unloading said automatic lift-type power generation equipment unit B at the storage plant. This method example 2 resembles method example 1. Detailed descriptions identical to those given in the case of method example 1 are omitted hereafter.

The first procedure in this method example according to the present invention is the installation of the automatic lift-type power generation equipment unit B at the desired location of use. The optimum combination of said automatic lift-type power generation equipment unit and said carrying vehicle is selected. Since according to this method example, the power generation section and the automatic lifting-and-lowering section are loaded detachably with the use of a loading base plate in the automatic lift-type power generation equipment unit, three items including a power generation section, an automatic lifting-and-lowering section suitable for said power generation section, and a carrying vehicle suitable for loading said power generation section and automatic lifting-and-lowering section are selected.

The following descriptions relate to an example wherein the power generation section 1B of the automatic lift-type power generation equipment unit B, automatic lifting-and-lowering section 2B, and a trailer b are selected as the optimum combination mentioned above.

If power generation section 1B has already been loaded onto the automatic lifting-and-lowering section 2B at the storage plant of the automatic lift-type power generation equipment unit B, the automatic lift-type power generation equipment unit B is loaded onto trailer b, just as in the case of installing and removing method example 1 above. But, if the power generation section 1B has not yet been loaded onto the automatic lifting-and-lowering section 2B, it is loaded via the use of a crane or the like only for the first time before the initial use of the mobile facility, and thereafter they are handled as an inseparable single body. As a result, in the same manner as with installing and removing method example 1, the automatic lift-type generation equipment unit B is loaded onto trailer b.

The automatic lift-type generation equipment unit B comprises the loading base plate 12B, tank 13B of power generation section 1B as a cooling mechanism, cooling section 15B, and the feed-water port 17B. As a result, the automatic lift-type generation equipment unit B becomes heavier than the automatic lift-type generation equipment unit A and the carrying vehicle can be a large one similar to trailer b. In this case, the fact that there are limitations on road use on the basis of the width of roads, traffic, maximum load-carrying capacity of roads and bridges must be taken into consideration.

Cubicle 3B may comprise tank 13B of power generation section 1B as a cooling mechanism and the feed-water port 17B in addition to cooling section 15B. Then, the automatic lift-type generation equipment unit B is transported and installed at the desired location of use for a power generation purpose. In the power generation process, the radiator may be partially or totally sprayed with water to protect the prime mover equipment 14B and to cool the power generation section 1B itself by means of tank 13B of the power generation section 1B, the cooling section 15B, and the feed-water port 17B enabling an efficient and stable power supply. The said cooling method may be replaced by an air cooling method or an air-and-water cooling method. After the completion of the power supply process, the following procedure is executed.

The second procedure in this method example according to the present invention is the removal of the automatic lift-type power generation equipment unit B from said desired location of use. During the procedures of loading, transporting, and unloading in connection with the removal of the automatic lift-type power generation equipment unit B, the power generation section 1B and the chassis 6B are treated as an inseparable single body. The procedures of loading, transporting, and unloading are executed by adopting the procedures described above in reverse order.

To evaluate the equipment in this method example, the automatic lift-type power generation equipment unit B is inferior to the automatic lift-type power generation equipment unit A in apparatus example 1 in terms of dimensions, weight, strength, layout and the like. Though the power generation section 1B and the automatic lifting-and-lowering section 2B are treated as an inseparable single body under normal condition, they can be detached with ease. So the automatic lift-type power generation equipment unit B is superior to the automatic lift-type power generation equipment unit A in that either one of them can be removed and replaced with a new one, in the event that either power generation section 1B or the automatic lifting-and-lowering section 2B breaks down during the series of procedures described above.

This method example is interior to method example 1 in that a crane is used only once when loading the power generation section 1B onto the automatic lifting-and-lowering section 2B at the storage plant prior to the initial use of the mobile facility. However, compared to the prior art, this method example is superior in that no crane is used at the use location.

Since power generation section 1B and the automatic lifting-and-lowering section 2B are loaded detachably via the use of a loading base plate according to this method example, a conventional mobile power generation equipment unit can be employed as the power generation section 1B.

Just as in the case of apparatus example 2, the method example described above can be widely applied to any installation and removal method comprising the loading, unloading, and transportation of an automatic lift-type mobile facility, wherein the mobile facility to be installed at the desired location of use is loaded detachably via the use of a loading base plate on automatic lifting-and-lowering section 2B.

<Apparatus Example 3>

Figure 8:
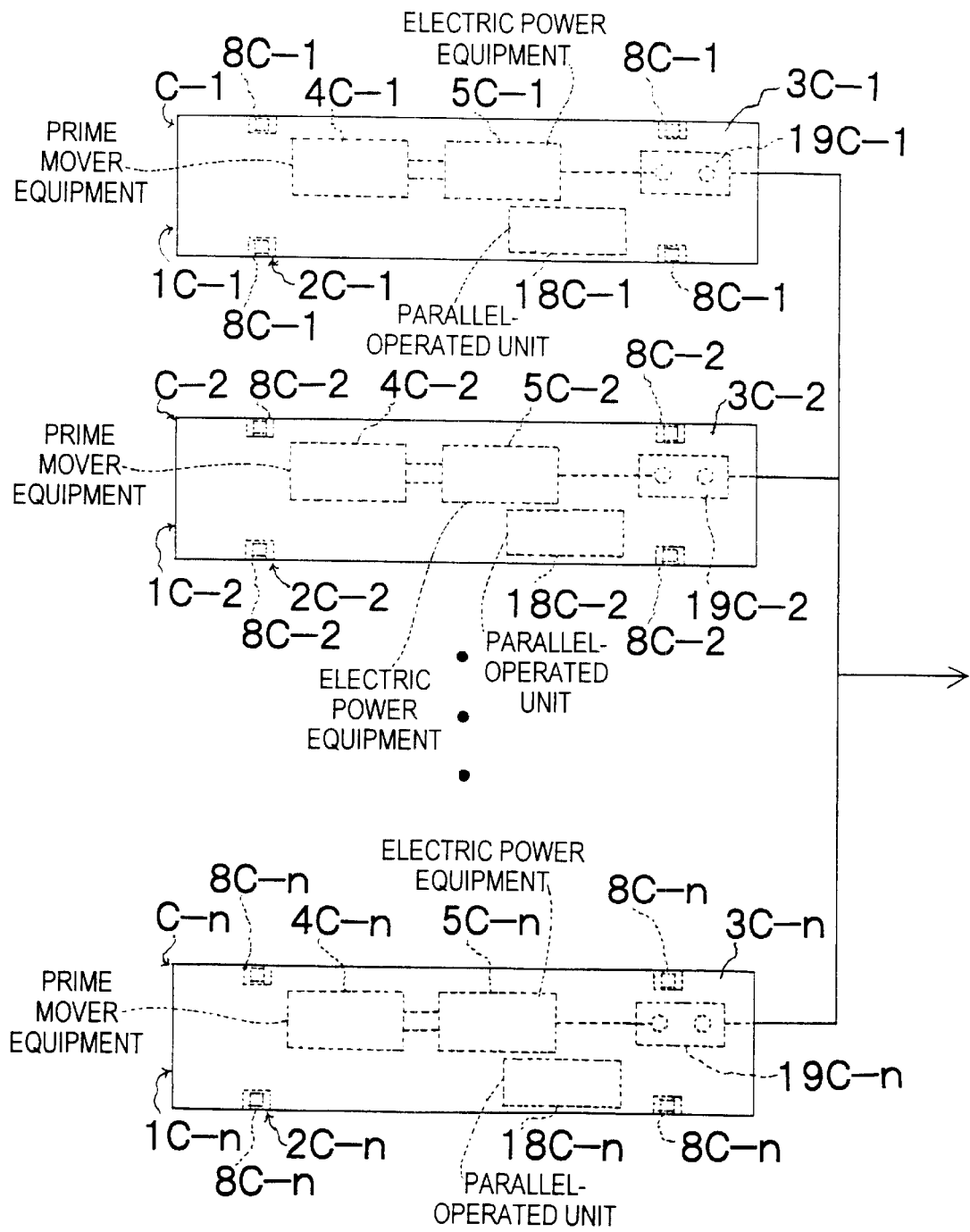
FIG. 8 shows a schematic representation of the parallel connection of a plurality of automatic lift-type power generation equipment units according to apparatus example 3.

Apparatus example 3 is described below with reference to FIG. 8.

Each automatic lift-type power generation equipment units C-1 through C-n is an integer higher than 1) according to this apparatus example 3 comprises a power generation section 1C-1 through 1C-n and an automatic lifting-and-lowering section 2C-1 through 2C-n. Said power generation sections 1C-1 through 1C-n and the automatic lifting-and-lowering sections 2C-1 through 2C-n may be either integral as in the case of apparatus example 1 or detachable from each other as in the case of apparatus example 2.

Power generation sections 1C-1 through 1C-n as in the case of apparatus example 1, each comprises a cubicle 3C-1 through 3C-n, a prime mover equipment 4C-1 through 4C-n, and housing sections and accommodating recesses which are not represented in the figure. Power generation sections 1C-1 through 1C-n further comprise parallel-operated unit 18C-1 through 18C-n which operates in parallel by synchronizing the frequencies, voltages, and phases of electricity output from other automatic lift-type power generation equipment units and sharing the load, and connecting units 19C-1 through 19C-n which connect the automatic lift-type power generation equipment units with other automatic lift-type power generation equipment units.

Power generation, sections 1C-1 through 1C-n are each provided with a frequency selecting unit, though not represented in the figure, which selects either 50 Hz or 60 Hz for the frequency of the output power.

Said power generation section s1C-1 through 1C-n are each provided with an automatic start and stop unit, though not represented in the figure, which automatically starts or stops the power supply operation in accordance with the availability of the normal power supply.

The power generation sections may comprise a loading base plate, a cooling section, a tank, a control panel, doors, and a feed-water port, as in the case of apparatus example 2.

The automatic lifting-and-lowering sections 2C-1 through 2C-n comprise jacks 8C-1 through 8C-n, a chassis, and outriggers, as in the case of apparatus example 1 or 2.

<Installing and Removing Method Example 3>

This method example is applied to apparatus example 3 and is described below with reference to FIG. 8 as in the case of apparatus example 3 above.

In this method example, the installing and removing method, for executing power generation at the desired location of use which is distanced from the storage plant of said automatic lift-type power generation equipment units C-1 through C-n, according to the present invention comprise a series of procedures including the loading of said automatic lift-type power generation equipment units C-1 through C-n onto said carrying vehicle at the storage plant, transporting said automatic lift-type power generation equipment units C-1 through C-n to said desired location of use, installing said automatic lift-type power generation equipment units C-1 through C-n at said desired location of use, re-loading said automatic lift-type power generation equipment units C-1 through C-n onto said carrying vehicle at said desired location of use, transporting said automatic lift-type power generation equipment units C-1 through C-n to the storage plant, and unloading said automatic lift-type power generation equipment units C-1 through C-n at the storage plant.

This method example 3 resembles the installing and removing method example 1 and installing and removing method example 2. Detailed descriptions identical to those given in the case of installing and removing method example 1 and installing and removing method example 2 are omitted hereafter.

The first procedure in the method example according to the present invention is the installation of the automatic lift-type power generation equipment unit B at the desired location of use. The optimum combination of said automatic lift-type power generation equipment unit and said carrying vehicle is selected. Since a plurality of automatic lift-type power generation equipment units are connected in parallel according to this method example, a plurality of automatic lift-type power generation equipment units and carrying vehicles suitable for said automatic lift-type power generation equipment units are selected.

The following descriptions relate to an example wherein the power generation section 1B of the automatic lift-type power generation equipment units C-1 through C-n and respective carrying vehicles are selected as the optimum combination mentioned above.

Then, the automatic lift-type power generation equipment units C-1 through C-n are each loaded onto separate carrying vehicles via the use of outriggers and universal casters, and transported to the desired location of use, and further installed after adjustment to the optimum position for each installation.

Next, power generation is executed by each of the automatic lift-type power generation equipment units C-1 through C-n. The applicable power generation method is described in the <Power Generation Method Example> below. After completion of power supply, the following procedure is executed.

The second procedure in the method example according to the present invention is the removal of the automatic lift-type power generation equipment units C-1 through C-n from said desired location of use. The procedures of loading, transporting, and unloading the automatic lift-type power generation equipment units C-1 through C-n in the removal procedure are executed by adopting the procedures described above in reverse order.

<Power Generation Method Example>

This method example is applied to apparatus example 3 and is described below with reference to FIG. 8 as in the case of apparatus example 3 above.

The power generation method according to this method example comprises connecting the automatic lift-type power generation equipment units C-1 through C-n in parallel and generating electricity. By using the connecting units 19C-1 through 19C-n of the automatic lift-type power generation equipment units C-1 through C-n which are referred to in <Installing and Removing Method Example 3> above, the electric power equipment 5C-1 through 5C-n of the respective power generation sections 1C-1 through 1C-n installed in place at the desired location of use for the demand of electricity are connected in parallel. After that, power generation is started.

The electric power equipment 5C-1 through 5C-n of the power generation sections 1C-1 through 1C-n are connected in parallel via the use of connecting units 19C-1 through 19C-n, and then power generation is started.

The total output is equal to the sum of the respective outputs from the automatic lift-type power generation equipment units C-1 through C-n. The respective outputs of power generation undergo the synchronization of the frequencies, voltages, and phases by the parallel-operated units 18C-1 through 18C-n, otherwise if different outputs from each of the automatic lift-type power generation equipment units C-1 through C-n are required, the output power is adjusted using the load sharing function of the parallel-operated units 18C-1 through 18C-n.

When the automatic lift-type power generation equipment units C-1 through C-n comprise a frequency selecting unit, the automatic lift-type power generation equipment units C-1 through C-n can supply electricity to districts of both 50 Hz and 60 Hz frequencies as necessary.

With this frequency selecting unit, not only is a power supply available in any district from the north to the south of the country but a power supply is also available even during the summer months and in the southern districts that are subject to high temperatures or strong direct sunlight which are the main causes of system overheat, on condition that the automatic lift-type power generation equipment units C-1 through C-n are provided with cooling equipment including a cooling section, a tank, a feed-water port, and the like.

Since the automatic lift-type power generation equipment units C-1 through C-n are each provided with an automatic start and stop unit, the power supply can be automatically switched to the automatic lift-type power generation equipment units C-1 through C-n by automatically starting the automatic lift-type power generation equipment units C-1 through C-n if the normal power supply shuts down and power supply can be automatically switched to the normal power supply when the normal power supply resumes by automatically selecting the normal power supply from the automatic lift-type power generation equipment units C-1 through C-n and automatically stopping the automatic lift-type power generation equipment units C-1 through C-n at the same time, when the automatic lift-type power generation equipment units C-1 through C-n are used as an emergency power supply.

With this automatic start and stop unit provided, the operation for switching the power supply does not require any operator to be in attendance, fuel for power generation is saved, and an efficient power supply is realized.

The power generation mode with the use of said frequency selecting unit and said automatic start and stop unit is applicable to the power generation according to apparatus example 1 or 2 where the automatic lift-type power generation equipment units are operated singularly.

The power generation is controlled by the control panel described in apparatus example 2. When said control panel, housed in a control room, is provided within cubicles 3C-1 through 3C-n, control operation can be executed inside the control room.

As is obvious from the descriptions above, power generation by connecting automatic lift-type power generation equipment units in parallel eliminates the need for providing special automatic lift-type power generation equipment units with a high output capacity even when the demand is great. Such a great demand is satisfied so long as the total sum of the output by said automatic lift-type power generation equipment units connected in parallel can reach the required level.

For example, when the demand is 1000 kW, connecting two automatic lift-type power generation equipment units with an output capacity of 500 kW each in parallel can substitute for using a single automatic lift-type power generation equipment unit with a capacity of 1000 kW.

With this advantageous characteristic of the method, further increases in the size and weight of the automatic lift-type power generation equipment units to obtain a greater capacity are prevented, to eliminate the limitations related to transportation arrangements. For example, when a large automatic lift-type power generation equipment unit for a great output capacity is required to be transported on a trailer, a plurality of automatic lift-type power generation equipment unit each with lower output capacity can be transported on large or normal freight trucks which are subject to fewer constrains related to the conditions of the roads when compared to those which apply to trailers.

In addition, in connection with such large or normal freight trucks, the number of drivers qualified to drive them is larger than that for those qualified to drive trailers, which means it is easier to secure carrying vehicles as well as drivers.

Furthermore, this power generation method has another excellent feature. That is, if a single automatic lift-type power generation equipment unit is used and the demand increases to a higher level than originally anticipated, the particular automatic lift-type power generation equipment unit in use must be replaced with another unit with a higher capacity, while in the present invention, the addition of another automatic lift-type power generation equipment unit only is required to meet the total demand level when a plurality of automatic lift-type power generation equipment units is connected in parallel as described above are employed.

For example, when the demand level is changed from 1000 kW to 1500 kW which is met with two automatic lift-type power generation equipment units with a capacity of 500 kW each, it is only necessary to add another automatic lift-type power generation equipment unit with a capacity of 500 kW to be connected in parallel with the two previously arranged.

If only a single automatic lift-type power generation equipment unit is used and the particular automatic lift-type power generation equipment unit breaks down, no power supply can be expected. However, if a plurality of automatic lift-type power generation equipment units connected in parallel according to this method and as described above, are employed and one of those units breaks down, the particular automatic lift-type power generation equipment unit in trouble can be disconnected with the power supply maintained for the mean time before the replacement unit is delivered. In short, this method operates on a low- risk basis.

Even when the demand is lower than the output capacity of the power generation section of the automatic lift-type power generation equipment unit, the low-load (or no-load) fuel consumption of the power generation section of the automatic lift-type power generation equipment unit does not change. As a result, operating a single automatic lift-type power generation equipment unit is not economical. On the other hand, a plurality of automatic lift-type power generation equipment units connected in parallel according to this method and as described above, if combined for high efficiency as a whole, can reduce the low-load (or no-load) fuel consumption to operate a power supply both efficiently and economically.

A plurality of automatic lift-type power generation equipment units connected in parallel according to this method and as described above, can meet a great demand by forming groups of a plurality of automatic lift-type power generation equipment units connected in parallel. And a plurality of automatic lift-type power generation equipment units connected in parallel according to this method and as described above, can also meet a lower level of demand by dividing said groups to constitute a suitable number of units to suit the designated purpose. So each automatic lift-type power generation equipment unit is utilized efficiently.

It is further understood by those skilled in the art that the foregoing descriptions are preferred embodiments of the invention disclosed herein. The embodiments mentioned above are therefore illustrative and not restrictive and various modifications in the methods or mechanisms therein may be made without departing from the objects and effects or the spirit and scope of the invention.

In accordance with the descriptions related to the present invention above, the invention with an automatic lift-type mobile facility comprising the mobile facility and automatic lifting-and-lowering section can bring about such improvements as mentioned below in installing and removing said automatic lift-type mobile facility.

As has been described above, the loading and unloading procedures which do not require the use of a crane, which means a reduction in the number of operators and the radio control system further results in simplified and safe working procedures. The automatic lift-type mobile facility can be transported without restrictions related to roads and installed in any position at the desired location of use, even if the surface of the installation is uneven, irregular, or narrow.

When said mobile facility and said automatic lifting-and-lowering section are structured to be integral with each other and inseparable, not only does it have excellent characteristics with respect, to the dimensions, weight, strength, and layout but also the advantage of eliminating the process of loading the mobile facility onto the automatic lifting-and-lowering section is resulted. On the other hand, when said mobile facility and said automatic lifting-and-lowering section are structured to be detachable from each other, the risk of total breakdown can be reduced by replacing either one of the two. Compared to the conventional mixed transportation method, the transportation method according to the present invention which includes the use of self-driven marine-transport containers or land-transport containers allow transportation by ship or train in addition to ground transportation.

With the power generation method in which a plurality of automatic lift-type power generation equipment units is connected in parallel, further increases in the size and weight of the automatic lift-type power generation equipment units for a greater capacity are prevented to eliminate the limitations related to transportation arrangements. In addition, said method can reduce the risk of a total breakdown of the system, lower the low-load (or no-load) fuel consumption, and further realize effective utilization of each of the automatic lift-type power generation equipment units by dividing groups of a plurality of automatic lift-type power generation equipment units to constitute a suitable number of units to the purpose.

With said frequency selecting unit, automatic start and stop unit, and cooling equipment provided, the automatic lift-type power generation equipment unit can supply electricity to districts of both 50 Hz and 60 Hz frequencies as necessary, automatically start or stop power generation in accordance with the availability of a normal power supply, and realize efficient power generating operation.

What is claimed is:

1. An automatic lift-type mobile facility to be installed at a desired location of use and to be removed from said desired location after completion of a desired task, comprising:

a mobile facility to be installed at said desired location; and
    an automatic lifting-and-lowering section automatically lifting and lowering said mobile facility, said automatic lifting-and-lowering section being capable of changing a position of said mobile facility, said automatic lifting-and-lowering section including:
    a chassis forming a generally rectangular underframe;
    at least four outriggers respectively attached adjacent to corners of said chassis, each of said outriggers being extendable and retractable horizontally;
    jacks attached to respective outer end portions of said outriggers, each of said jacks being extendable and retractable vertically so as to non-movably and elevatedly support said mobile facility above ground level, said jacks being operative in combination with said outriggers;
    at least four universal casters respectively attached adjacent to corners of said chassis, each of said universal casters being capable of bobbing up and down so as to movably and horizontally position said mobile facility proximate to ground level; and
    caster housings, said universal casters being mounted and arranged with respect to said caster housings in such a manner that said universal casters are retractable into respective ones of said caster housings.

2. An automatic lift-type mobile facility according to claim 1, wherein said mobile facility is detachably loaded onto said automatic lifting-and-lowering section.

3. An automatic lift-type mobile facility according to claim 1 or 2, wherein said universal caster comprises:
    at least one wheel; and
    a power unit for providing said wheel with driving power.

4. An automatic lift-type mobile facility according to claim 1 or 2, wherein said automatic lifting-and-lowering section includes a controller unit controlling operation of said automatic lifting-and-lowering section.

5. An automatic lift-type mobile facility according to claim 4, wherein said controller unit comprises a remote control unit operated externally by radio.

6. An automatic lift-type mobile facility according to claim 1 or 2, wherein said automatic lifting-and-lowering section includes a loading base plate onto which said mobile facility is loaded.

7. An automatic lift-type mobile facility according to claim 1 or 2, wherein said mobile facility comprises a power generation section generating and supplying electric power, and said automatic lift-type mobile facility comprises an automatic lift-type power generation equipment unit.

8. An automatic lift-type mobile facility according to claim 7, wherein said power generation section comprises:
    a cubicle comprising a housing;
    a prime mover equipment supplying prime mover required for electric power generation, said prime mover equipment being loaded inside said cubicle; and
    an electric power equipment generating electric power by utilizing said prime mover provided by said prime mover equipment, said electric power equipment being loaded inside said cubicle.

9. An automatic lift-type mobile facility according to claim 8, wherein said power generation section includes a door for accessing an inside of said cubicle for a maintenance purpose.

10. An automatic lift-type mobile facility according to claim 8, wherein said power generation section comprises, in place of said cubicle, one of a marine-transport container for a container ship and a land-transport container for a container train, each of said containers being capable of stacking vertically.

11. An automatic lift-type mobile facility according to claim 7, wherein said power generation section includes cooling equipment cooling said power generation section itself.

12. An automatic lift-type mobile facility according to claim 11, wherein said cooling equipment comprises:
    a cooling section cooling a radiator by spraying water thereto;
    a tank storing said water for a cooling purpose; and
    a feed-water port through which said water is supplied to said tank.

13. An automatic lift-type mobile facility according to claim 11, wherein said cooling equipment is provided inside said cubicle.

14. An automatic lift-type mobile facility according to claim 7, wherein said power generation section includes a control panel controlling said power generation section.

15. An automatic lift-type mobile facility according to claim 7, wherein said automatic lift-type mobile facility comprises a plurality of automatic lift-type mobile facilities, each of said power generation sections in each of said automatic lift-type mobile facilities being capable of being connected in parallel.

16. An automatic lift-type mobile facility according to claim 15, wherein said each of said power generation sections in each of said automatic lift-type mobile facilities comprises:

a parallel-operated unit operating in parallel by synchronizing an output from each of said electric power equipment in each of said power generation sections and sharing an electric load; and a connecting unit interconnecting each of said electric power equipment in each of said power generation sections.

17. An automatic lift-type mobile facility according to claim 7, wherein said power generation section includes a frequency switch for selecting one of 50 Hz or 60 Hz for an output.

18. An automatic lift-type mobile facility according to claim 7, wherein said power generation section includes an automatic actuating and deactivating unit automatically actuating and deactivating power generating operation in accordance with functional availability of a fixed power supply.

* * * * *